United States Patent
Kawashima et al.

(10) Patent No.: US 10,075,031 B2
(45) Date of Patent: Sep. 11, 2018

(54) ELECTRIC MOTOR

(71) Applicant: Mitsuba Corporation, Gunma (JP)

(72) Inventors: Yoshichika Kawashima, Kiryu (JP); Teppei Tokizaki, Kiryu (JP); Natsumi Tamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 408 days.

(21) Appl. No.: 14/779,360

(22) PCT Filed: Mar. 25, 2014

(86) PCT No.: PCT/JP2014/058351
§ 371 (c)(1),
(2) Date: Sep. 23, 2015

(87) PCT Pub. No.: WO2014/157242
PCT Pub. Date: Oct. 2, 2014

(65) Prior Publication Data
US 2016/0065012 A1  Mar. 3, 2016

(30) Foreign Application Priority Data

Mar. 26, 2013 (JP) ................................ 2013-063214
Dec. 26, 2013 (JP) ................................ 2013-270446

(51) Int. Cl.
*H02K 1/22* (2006.01)
*H02K 23/18* (2006.01)
(Continued)

(52) U.S. Cl.
CPC ............ *H02K 1/223* (2013.01); *H02K 1/265* (2013.01); *H02K 23/18* (2013.01); *H02K 23/32* (2013.01); *H02K 23/40* (2013.01); *H02K 7/1166* (2013.01)

(58) Field of Classification Search
CPC ........ H02K 1/223; H02K 1/265; H02K 23/18; H02K 23/32; H02K 23/40
See application file for complete search history.

(56) References Cited

U.S. PATENT DOCUMENTS 2,311,700 A * 2/1943 Schwarz ................ H02K 23/26
                                                                 310/173
3,651,356 A * 3/1972 Seilly ...................... H02K 3/18
                                                                 310/180
(Continued)

FOREIGN PATENT DOCUMENTS

CN        1599211 A       3/2005
JP     2005-033843 A      2/2005
(Continued)

OTHER PUBLICATIONS

Chinese Patent Office, Office Action issued in Chinese Patent Application No. 201480017844.5 dated Aug. 15, 2017, 18 pages.
(Continued)

*Primary Examiner* — Robert W Horn
(74) *Attorney, Agent, or Firm* — Wood Herron & Evans LLP

(57) ABSTRACT

An electric motor includes a yoke having six magnetic poles; a rotary shaft which is provided inside the yoke in a freely rotatable manner; an armature core (6) which has teeth (36) attached to the rotary shaft, radially extending in a radial direction and set in an arrangement of an even number, and an even number of slots (37) formed between the teeth; an armature coil (7) which is wound around the teeth in a single wave winding; and a commutator (13) which is provided in the rotary shaft to be adjacent to the armature core (6) and has a plurality of circumferentially disposed segments (41) to which the armature coil (7) is connected.

9 Claims, 31 Drawing Sheets

(51) Int. Cl.
*H02K 23/32* (2006.01)
*H02K 23/40* (2006.01)
*H02K 1/26* (2006.01)
*H02K 7/116* (2006.01)

(56) References Cited

U.S. PATENT DOCUMENTS

| | | | | | |
|---|---|---|---|---|---|
| 3,705,459 | A | * | 12/1972 | Biddison | H02K 13/04 242/433.3 |
| 4,437,029 | A | * | 3/1984 | Ban | H02K 23/54 310/154.05 |
| 5,072,129 | A | * | 12/1991 | Sugiyama | F02N 15/066 290/48 |
| 5,191,257 | A | * | 3/1993 | Sugiyama | H02K 23/32 310/198 |
| 5,202,599 | A | * | 4/1993 | Kao | H02K 23/28 310/154.47 |
| 6,079,659 | A | * | 6/2000 | Yamamura | H02K 15/09 242/433.2 |
| 6,392,311 | B2 | * | 5/2002 | Inaba | F02N 11/04 290/31 |
| 6,462,454 | B2 | * | 10/2002 | Yamamoto | H02K 23/32 310/185 |
| 7,239,063 | B2 | * | 7/2007 | Yamamoto | H02K 13/10 310/204 |
| 7,557,484 | B2 | * | 7/2009 | Kawashima | H02K 23/20 310/198 |
| 7,928,629 | B2 | * | 4/2011 | Aoyama | H02K 23/32 310/197 |
| 8,079,133 | B2 | * | 12/2011 | Roos | H02K 23/30 29/598 |
| 8,643,963 | B2 | * | 2/2014 | Li | H02K 23/32 359/822 |
| 9,118,223 | B2 | * | 8/2015 | Magnetti | H02K 3/12 |
| 2002/0105294 | A1 | | 8/2002 | Harada et al. | |
| 2006/0244334 | A1 | | 11/2006 | Furui | |
| 2010/0264772 | A1 | * | 10/2010 | Aoyama | H02K 23/32 310/195 |
| 2014/0042863 | A1 | * | 2/2014 | Ojima | H02K 57/006 310/195 |
| 2014/0217846 | A1 | * | 8/2014 | Kasper | H02K 21/14 310/156.01 |
| 2015/0130329 | A1 | * | 5/2015 | Kawashima | H02K 23/32 310/68 C |
| 2016/0065012 | A1 | * | 3/2016 | Kawashima | H02K 23/18 310/156.01 |

FOREIGN PATENT DOCUMENTS

| | | |
|---|---|---|
| JP | 2006-523430 A | 10/2006 |
| JP | 2006352993 A | 12/2006 |
| JP | 2007-151268 A | 6/2007 |
| JP | 2007-282451 A | 10/2007 |
| JP | 2009022120 A | 1/2009 |
| JP | 2010035405 A | 2/2010 |
| JP | 2010172174 A | 8/2010 |
| JP | 2010-213490 A | 9/2010 |
| JP | 2011-114997 A | 6/2011 |
| JP | 2011-130613 A | 6/2011 |
| JP | 2011130640 A | 6/2011 |
| JP | 2012-130163 A | 7/2012 |
| JP | 2014-036533 A | 2/2014 |
| WO | 2010-058851 A1 | 5/2010 |

OTHER PUBLICATIONS

European Patent Office, International Search Report issued in European Patent Application No. 14774226.6 dated Nov. 18, 2016, 10 pages.

Japanese Patent Office, International Search Report issued in corresponding International Patent Application No. PCT/JP2014/058351 and English-language translation dated Jun. 17, 2014.

Japanese Patent Office, Notice of Allowance issued in Japanese Patent Application No. 2015-508561 dated Jan. 4, 2017, 6 pages.

* cited by examiner

ELECTRIC MOTOR

TECHNICAL FIELD

The present invention, for example, relates to an electric motor mounted in a vehicle.

Priority is claimed on Japanese Patent Application Nos. 2013-063214, filed Mar. 26, 2013, and 2013-270446, filed Dec. 26, 2013, the contents of which are incorporated herein by reference.

BACKGROUND ART

Electric motors include, for example, an electric motor in which a plurality of permanent magnets is disposed on an inner circumferential surface of a bottomed cylindrical yoke, and an armature is rotatably provided radially inward from the permanent magnets. The armature includes an armature core externally fitted to a rotary shaft, and a commutator having a plurality of segments disposed thereon. A plurality of teeth extending radially outward is provided on the armature core, and a plurality of axially elongated slots is formed between the teeth. Windings are wound around the armature core via the slots. The windings are electrically connected to a segment of the commutator. A brush for supplying the electric power comes into slide contact with each segment. Current is supplied to the windings via the brush.

Here, in order to reduce size of the electric motor and achieve high performance, various techniques have been suggested. For example, there is disclosed a so-called 4-pole 10-slot 10-segment electric motor in which the number of magnetic poles is set to four by providing the four permanent magnets, the number of slots is set to 10 by forming ten teeth in the armature core, and ten segments are provided in the commutator (for example, see Patent Literature 1).

The windings wound around the electric motor are wound over two teeth in a so-called multiple winding method. Moreover, in the electric motor, the segments having the same potential, i.e., two segments facing each other around the rotary shaft, are short-circuited by an equalizer. Thus, it is possible to reduce the number of installations of the brushes to reduce the size of the electric motor, while achieving the high performance of the electric motor.

Further, for example, there is also disclosed a so-called 6-pole 24-slot 24-segment electric motor in which the number of magnetic poles is set to 6 by providing the six permanent magnets, the number of slots is set to 24 by forming the twenty-four teeth in the armature core, and the twenty-four segments are provided in the commutator (e.g., see Patent Literature 2).

The 6-pole 24-slot 24-segment electric motor is equipped with three winding sections which are wound around each of three teeth groups made up of the four teeth a predetermined number of times, a jumper wire which extends from the winding section and is connected to the two segments, a main winding section which continuously has an intermediate jumper wire which connects the adjacent winding sections without being connected to the segment to be connected when each winding section is individually connected to the segment, and an equalizer (a short-circuit member) which connects a predetermined connected segment to which each jumper wire is connected and the segment to which each winding section is to be connected at the same potential. Thus, it is possible to reduce the number of installations of the brushes to reduce the size of the electric motor, while achieving the high performance of the electric motor by providing the multiple poles.

CITATION LIST

Patent Literature

[Patent Literature 1]
    Japanese Unexamined Patent Application, First Publication No. 2005-33843
[Patent Literature 2]
    Japanese Unexamined Patent Application, First Publication No. 2007-282451

SUMMARY OF INVENTION

Technical Problem

Incidentally, in the above-described Patent Literature 1, since the number of segments is 10 and the voltage between the segments becomes equivalent to the 2-pole 5-slot 5-segment electric motor, it is difficult to effectively achieve the high performance of the electric motor.

In addition, there is a need to dispose two brushes at intervals of a mechanical angle of 90° in a circumferential direction. Therefore, it is not possible to adopt a general brush arrangement structure of a 2-pole motor in which two brushes are disposed to face each other around the rotary shaft, and the manufacturing cost increases accordingly.

Further, since there is a need for an equalizer to reduce the number of installations of the brushes, it takes time to wind up the windings and the manufacturing cost increases accordingly.

Further, when winding windings around the armature core, it is not possible to adopt a so-called double flyer method in which the windings are simultaneously wound at two locations in a point symmetrical relationship around the rotary shaft. Thus, it takes time to wind the windings, and the manufacturing cost increases.

Further, in the above-described Patent Literature 2, since the number of segments is 24 and the voltage between the segments becomes equivalent to the 2-pole 8-slot 8-segment electric motor, it is difficult to effectively achieve the high performance of the electric motor. Moreover, as the number of the segments is large, it is difficult to reduce the size of the commutator. Further, since there is a need for an equalizer to reduce the number of installations of the brushes, it takes time to wind up the windings, and the manufacturing cost increases accordingly.

The present invention provides an electric motor capable of reducing the size and cost, while effectively achieving the high performance.

Solution to Problem

According to a first aspect of the present invention, an electric motor is equipped with a yoke having six magnetic poles; a rotary shaft which is provided inside the yoke in a freely rotatable manner; an armature core which has teeth attached to the rotary shaft to radially extend in a radial direction and set in an arrangement of an even number, and an even number of slots formed between the teeth; a coil which is wound around the teeth in a single wave winding; and a commutator which is provided in the rotary shaft to be adjacent to the armature core and has a plurality of circumferentially disposed segments to which the coil is connected.

According to a second aspect of the present invention, the coil wired between the armature core and the commutator may be wound around the rotary shaft.

According to a third aspect of the present invention, the electric motor may be equipped with a pair of brushes which come into slide contact with the segments to supply electric power to the coil. The pair of brushes may be disposed to face each other around the rotary shaft.

According to a fourth aspect of the present invention, the electric motor may be equipped with three brushes including a low-speed brush, a high-speed brush and a common brush, the low-speed brush and the high-speed brush coming into slide contact with the segments to supply the electric power to the coil, and the common brush being commonly used with the low-speed brush and the high-speed brush.

According to a fifth aspect of the present invention, the commutator of the electric motor may have a columnar commutator main body. The plurality of segments may be disposed on the outer circumferential surface of the commutator main body.

According to a sixth aspect of the present invention, the commutator of the electric motor may have a disc-shaped commutator main body. The plurality of segments may be disposed on one surface of the commutator main body on a side opposite to the armature core.

According to a seventh aspect of the present invention, the even number of slots may be configured to include a tip wide slot having a shape with a wide radial outer side, and a bottom wide slot having a shape with a wide bottom portion.

According to an eighth aspect of the present invention, the even number of slots may further include an intermediate width slot having a shape in which the radial outer side is narrower than the tip wide slot and the bottom portion is wider than the bottom wide slot.

According to a ninth aspect of the present invention, the plurality of teeth may have an asymmetrical shape in which the tip has a long side portion and a short side portion. Among the plurality of teeth, in the teeth constituting the tip wide slot, the tip may rotate, and the arrangement of the long side portion and the short side portion may be reversed.

According to a tenth aspect of the present invention, the tip wide slot, the bottom wide slot and the intermediate width slot may be disposed to correspond to a radial position in which the coil is wound around the teeth.

According to an eleventh aspect of the present invention, the number of the teeth and the slots may be one of 14, 16 and 20.

Advantageous Effects of Invention

According to the above-mentioned electric motor, by adopting the single wave winding, it is possible to reduce the voltage between the segments compared to the multiple winding method. Also, it is possible to adopt a brush arrangement of a typical two-pole motor in which the brushes are disposed to face each other around the rotary shaft. Furthermore, it is possible to shorten the winding time of the winding without requiring an equalizer. Also, when winding the windings around the armature core, it is possible to adopt a so-called double flier type in which the windings are simultaneously wound at two locations in a point symmetric relation around the rotary shaft. Also, by adopting the single wave winding, while setting the number of the slots to an even number, it is possible to obtain the same effect as in the case in which the number of slots is set to an odd number. That is, it is possible to reduce the cogging torque and the torque ripple as in the case in which the number of slots is set to an odd number, while setting the number of slots to an even number. Furthermore, since the coils wired between the armature core and the commutator are wound around the rotary shaft, it is possible to suppress the spreading of the coils between the armature core and the commutator, compared to the case in which the armature core and the commutator are directly wired by the coil.

In this way, according to the above-described electric motor, it is possible to reduce the size and the cost while effectively achieving the high performance.

DESCRIPTION OF EMBODIMENTS (First Embodiment) (Electric Motor)

Next, a first embodiment of the present invention will be described on the basis of FIGS. 1 to 4.

Figure 1:
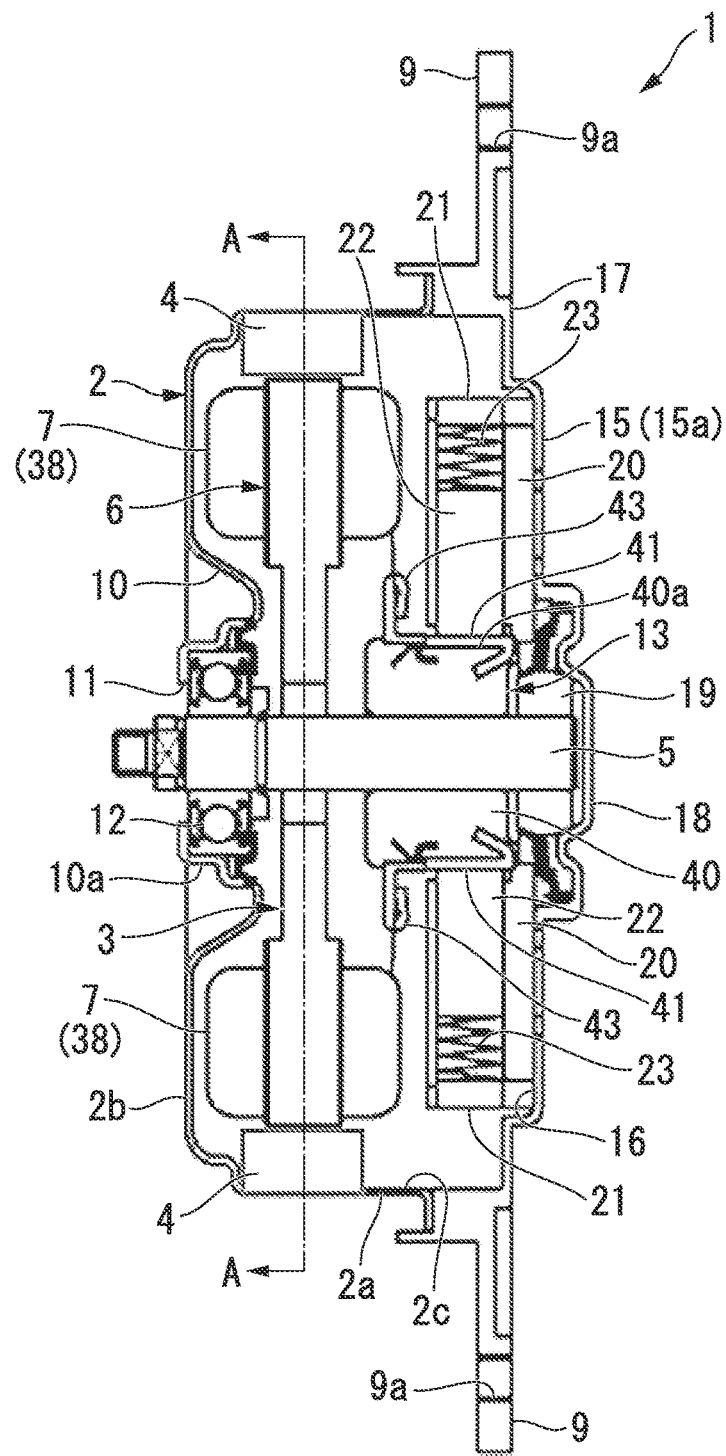
FIG. 1 is a longitudinal cross-sectional view illustrating a configuration of an electric motor according to a first embodiment of the present invention.
Figure 2:
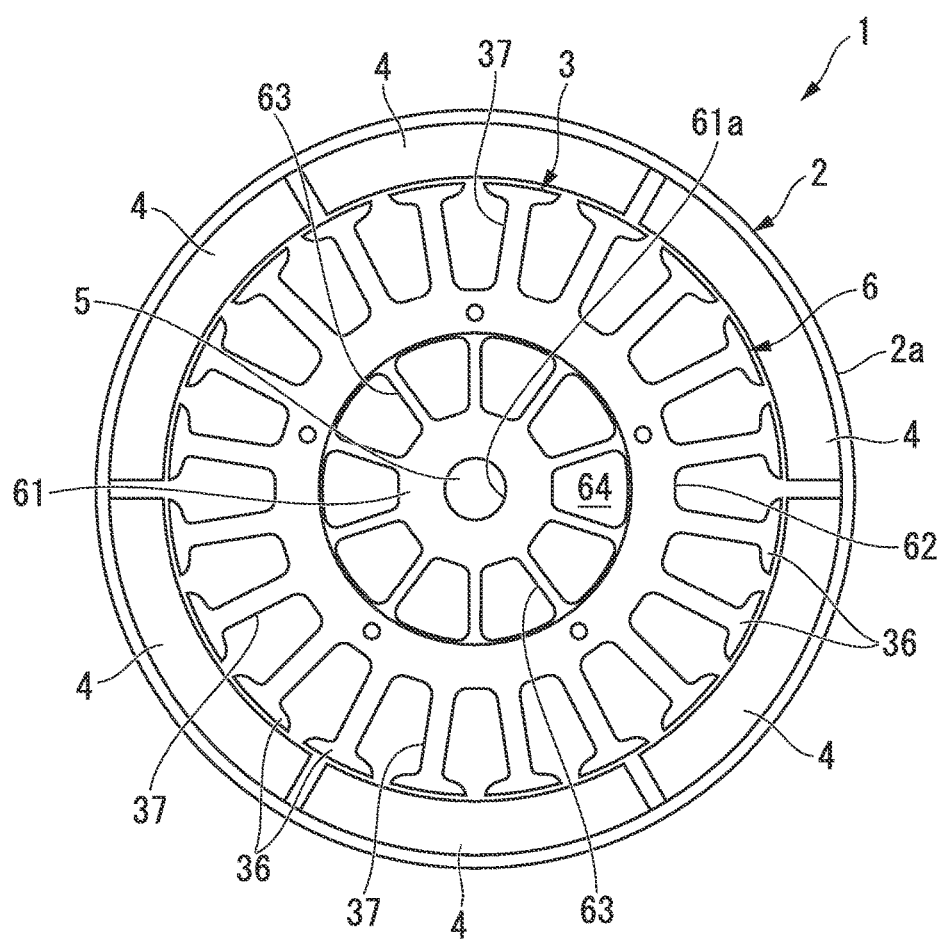
FIG. 2 is a cross-sectional view taken along the line A-A of FIG. 1 in which an armature coil is not illustrated.

FIG. 1 is a longitudinal cross-sectional view illustrating the configuration of an electric motor 1. FIG. 2 is a cross-sectional view taken along the line A-A of FIG. 1 which does not illustrate an armature coil 7.

As illustrated in FIGS. 1 and 2, the electric motor 1 is a so-called DC motor with a brush, and for example, is used as a fan motor for cooling a radiator of a motor vehicle. The electric motor 1 is equipped with an armature 3 provided in a yoke 2 having a bottomed cylindrical shape in a freely rotatable manner, and an opening portion 2c of the yoke 2 is covered with an end bracket 17. Further, the electric motor 1 is attached to the radiator of the motor vehicle in a state in which a rotary shaft 5 of the armature 3 is disposed in a horizontal direction.

(Yoke)

Six permanent magnets 4 having tile shapes (rectangular shapes having a curvature) are disposed on an inner surface of a circumferential wall 2a of the yoke 2 in the circumferential direction. The permanent magnets 4 are disposed with the magnetic poles sequentially disposed in the circumferential direction.

A recess 10 is formed in an end portion (a bottom portion) 2b of the yoke 2 in substantially a radial center. In a major part of the recess 10, a boss section 10a projecting toward the axial outer side is formed. In the boss section 10a, an insertion hole 11 for inserting one end (a left end in FIG. 1) of the rotary shaft 5 of the armature 3 is formed, and a bearing 12 for supporting one end side of the rotary shaft 5 in a freely rotatable manner is fitted into the boss section 10a.

(Armature)

The armature 3 is configured to include an armature core 6 which is externally fitted and fixed to the rotary shaft 5, an armature coil 7 wound around the armature core 6, and a commutator 13 disposed on the other end side of the rotary shaft 5 (a right side in FIG. 1).

The armature core 6 is formed by axially stacking a plurality of metal plates, or by pressure-molding a soft magnetic powder. The armature core 6 has a rotary shaft fixing section 61 having a substantially annular shape which is externally fitted and fixed to the rotary shaft 5. The rotary shaft 5 is press-fitted and fixed to the insertion hole 61a formed in the rotary shaft fixing section 61.

An outer annular section 62 formed concentrically with the rotary shaft fixing section 61 is provided on the radial outer side of the rotary shaft fixing section 61. Between the rotary shaft fixing section 61 and the outer annular section 62, a plurality of (e.g., ten in the first embodiment) spoke sections 63, which are provided between the rotary shaft fixing section 61 and the outer annular section 62 and connect them to each other, are provided at equal intervals in the circumferential direction. That is, a plurality of (e.g., ten in this embodiment) through-holes 64 which axially penetrate and have substantially a fan shape when viewed in the axial direction are formed in the armature core 6, by the rotary shaft fixing section 61, the outer annular section 62 and the spoke section 63. Further, the outer annular section 62 is formed thicker than the rotary shaft fixing section 61 and the spoke section 63.

On the radial outer side of the outer annular section 62, twenty teeth 36 having substantially a T shape when viewed in an axial plan are formed at equal intervals in the circumferential direction. A dovetail-shaped slot 37 is formed between the adjacent teeth 36. The slot 37 extends in the axial direction, and twenty slots are formed at equal intervals in the circumferential direction. Further, an enameled winding 38 (see FIG. 3) communicates with the slot 37, and the winding 38 is wound from the top of an insulator (not illustrated) mounted on the teeth 36. As a result, a plurality of armature coils 7 is formed on an outer circumference of the armature core 6. Further, the method of winding the winding 38 will be described later in detail.

The commutator 13 disposed on the other end side of the rotary shaft 5 includes a resin mold body 40 which is externally fitted and fixed to the rotary shaft 5 and is formed in a substantially columnar shape, and twenty segments 41 which are disposed to be exposed through the outer circumferential surface 40a of the resin mold body 40. That is, the electric motor 1 of the first embodiment is a so-called 6-pole 20-slot 20-segment DC motor which has the six permanent magnets 4 (the magnetic poles), the twenty slots 37 and the twenty segments 41.

The segments 41 are formed by an elongated plate-shaped metal piece in the axial direction, and are fixed in parallel at equal intervals in a circumferential direction, while insulated from each other. At the end portion of the segment 41 on the side facing the armature core 6, a riser 43 bent in the form of being folded to the outer diameter side is integrally formed.

The riser 43 is a member for connecting the armature coil 7 to the segment 41, and is configured by winding the winding 38 constituting the armature coil 7 and fixing it with fusing. Thus, the segment 41 and the armature coil 7 corresponding thereto are electrically connected to each other.

(End Bracket)

An end bracket 17 which covers the opening portion 2c of the yoke 2 is formed in substantially a disc shape. A protrusion 15 protruding outward is formed on a major part of a center of the end bracket 17. By forming the protrusion 15, the inner surface side becomes a recess shape. The recessed inner surface side of the protrusion 15 serves as a housing recess 16 for housing a brush 22 to be described later.

In substantially the radial center of the end portion (bottom portion) 15a of the protrusion 15, a boss section 18 that further projects outward by the step is formed. A bearing 19 for supporting the other end side of the rotary shaft 5 in a freely rotatable manner is press-fitted to the boss section 18.

A stay 9 extending outward is provided on the outer circumferential side of the end bracket 17. The stay 9 is used when fixing the electric motor 1. The stay 9 is formed with an insertion hole 9a into which a bolt (not illustrated) can be inserted.

Also, a holder stay 20 is attached to the housing recess 16 of the end bracket 17. The holder stay 20 is made of resin and is formed in substantially a disc shape. The two brush holders 21 are fixed to the inner surface of the holder stay 20.

The brush holders 21 are formed in rectangular parallelepiped box shapes of brass or the like. The brush holders 21 are disposed so that their longer direction extends in the radial direction, and are disposed to face each other around the rotary shaft 5.

The brushes 22 are built in the brush holders 21 to freely move back and forth with respect to the commutator 13, while the brush 22 is biased via the coil spring 23.

Since the tip portions of the brushes 22 are biased by the coil spring 23, the tip portions are in slide contact with the segments 41 of the commutator 13. The brushes 22 are electrically connected to an external power source via a pigtail (neither is illustrated). Therefore, through slide contact with the segments 41, a voltage is applied to the armature coil 7 via the segments 41.

(Winding Structure of Armature Coil)

Next, the winding structure of the armature coil 7 will be described with reference to FIGS. 3 and 4.

Figure 3:
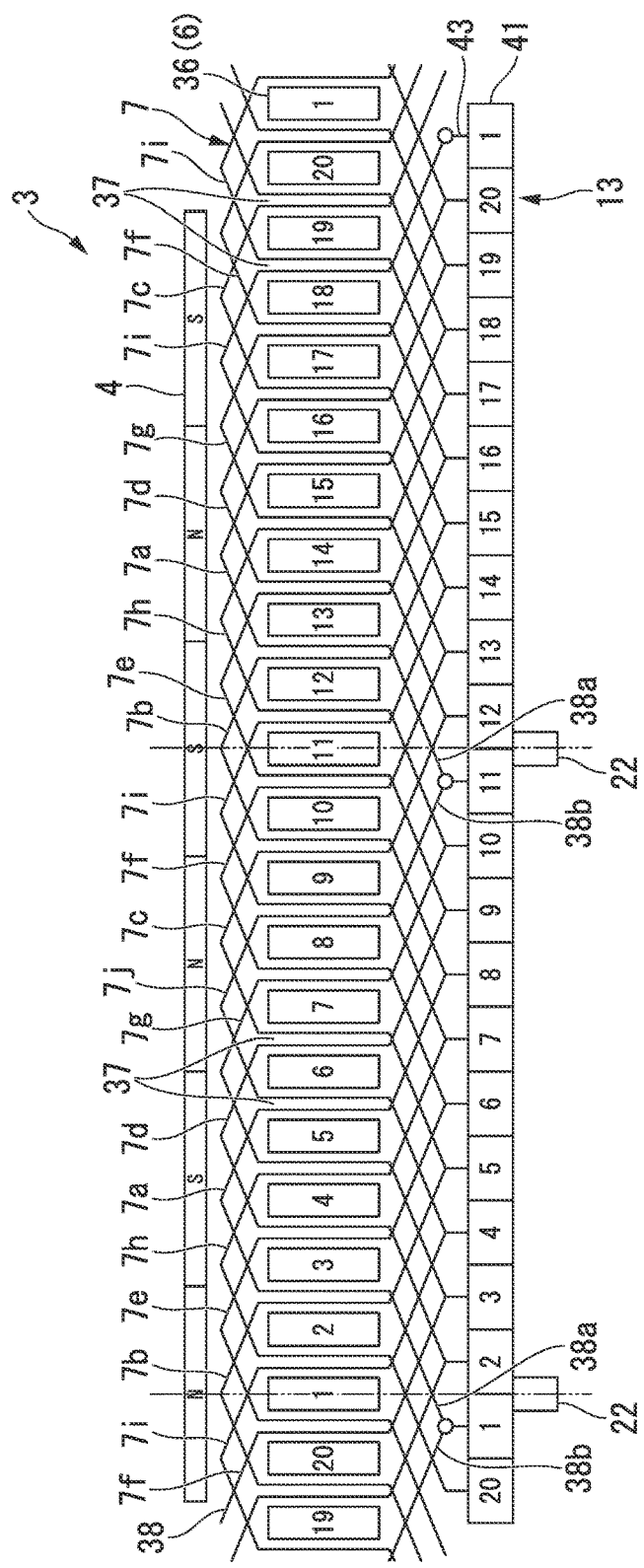
FIG. 3 is an exploded view of the armature according to the first embodiment of the present invention.

FIG. 3 is an exploded view of the armature 3, and a gap between the adjacent teeth 36 corresponds to the slot 37. FIG. 4 is an explanatory view in which a winding state of the armature coil 7 on the armature core 6 is viewed in the axial direction. In FIG. 3 below, each segment 41, each of the teeth 36 and the wound armature coil 7 will be described by being denoted by the corresponding reference numerals. In addition, among the reference numerals assigned to the segments 41, the segment 41 corresponding to No. 1 is disposed adjacent to the first tooth 36 to correspond to the position of the first tooth 36.

Here, the armature coil 7 is formed by winding the winding 38 between predetermined slots 37 in a so-called single wave winding. In addition, the armature coil 7 is formed by winding the winding 38 in a double flyer method. Further, the double flyer method refers to a type of simultaneously winding the winding 38 at two locations in a point symmetrical relation around the rotary shaft 5, using two flyers (not illustrated) of a winding machine used to wind the winding 38.

Hereinafter, this will be described in more detail.

When the double flyer method is adopted, two winding start terminals 38a of the winding 38 are present, and the winding 38 is wound around a riser 43 of the first segment 41 and a riser 43 of the eleventh segment 41 which are present at point-symmetric positions around the rotary shaft 5.

In the following description, a routing order of the winding 38 which begins to be wound from the first segment 41 and the winding 38 which begins to be wound from the eleventh segment 41 becomes point symmetry around the rotary shaft 5. Therefore, in the following description, only the winding 38 which begins to be wound from the first segment 41 will be described, and the winding 38 which begins to be wound from the eleventh segment 41 is denoted by the same reference numeral as the armature coil 7 formed by the winding 38 which begins to be wound from the first segment 41, and the description thereof will not be provided.

First, the winding 38 in which the winding start terminal 38a is wound around the riser 43 of the first segment 41 is inserted into the slot 37 between the second and third teeth 36, and is wound between the slot 37 and the slot 37 between the fifth and sixth teeth 36 N times (N is a natural number) to form a coil 7a. Next, the winding 38 is drawn out from the slot 37 between the fifth and sixth teeth 36 and is wound around the riser 43 of the eighth segment 41.

Subsequently, the winding 38 is inserted into the slot 37 between the ninth and tenth teeth 36, and is wound between the slot 37 and the slot 37 between the twelfth and thirteenth teeth 36 N times to form a coil 7b. Next, the winding 38 is drawn out from the slot 37 between the twelfth and thirteenth teeth 36, and is wound around the riser 43 of the fifteenth segment 41.

Subsequently, the winding 38 is inserted into the slot 37 between the sixteenth and seventeenth teeth 36, and is wound between the slot 37 and the slot 37 between the nineteenth and twentieth teeth 36 N times to form a coil 7c. Next, the winding 38 is drawn out from the slot 37 between the nineteenth and twentieth teeth 36, and is wound around the riser 43 of the second segment 41

Subsequently, the winding 38 is inserted into the slot 37 between the third and fourth teeth 36 and is wound between the slot 37 and the slot 37 between the sixth and seventh teeth 36 N times to form a coil 7d. Next, the winding 38 is drawn out from the slot 37 between the sixth and seventh teeth 36, and is wound around the riser 43 of the ninth segment 41.

Subsequently, the winding 38 is inserted into the slot 37 between the tenth and eleventh teeth 36, and is wound between the slot 37 and the slot 37 between the thirteenth and fourteenth teeth 36 N times to form a coil 7e. Next, the winding 38 is drawn out from the slot 37 between the thirteenth and fourteenth teeth 36, and is wound around the riser 43 of the sixteenth segment 41

Subsequently, the winding 38 is inserted into the slot 37 between the seventeenth and eighteenth teeth 36 and is wound between the slot 37 and the slot 37 between the twentieth and first teeth 36 N times to form a coil 7f. Next, the winding 38 is drawn out from the slot 37 between the twentieth and first teeth 36, and is wound around the riser 43 of the third segment 41.

Subsequently, the winding 38 is inserted into the slot 37 between the fourth and fifth teeth 36, and is wound between the slot 37 and the slot 37 between the seventh and eighth teeth 36 N times to form a coil 7g. Next, the winding 38 is drawn out from the slot 37 between the seventh and eighth teeth 36, and is wound around the riser 43 of the tenth segment 41.

Subsequently, the winding 38 is inserted into the slot 37 between the eleventh and twelfth teeth 36 and is wound between the slot 37 and the slot 37 between the fourteenth and fifteenth teeth 36 N times to form a coil 7h. Next, the winding 38 is drawn out from the slot 37 between the fourteenth and fifteenth teeth 36, and is wound around the riser 43 of the seventeenth segment 41.

Subsequently, the winding 38 is inserted into the slot 37 between the eighteenth and nineteenth teeth 36, and is wound between the slot 37 and the slot 37 between the first and second teeth 36 N times to form a coil 7i. Next, the winding 38 is drawn out from the slot 37 between the first and second teeth 36, and is wound around the riser 43 of the fourth segment 41

Subsequently, the winding 38 is inserted into the slot 37 between the fifth and sixth teeth 36 and is wound between the slot 37 and the slot 37 between the eighth and ninth teeth 36 N times to form a coil 7j. Next, the winding 38 is drawn out from the slot 37 between the eighth and ninth teeth 36, and is wound around the riser 43 of the eleventh segment 41.

Thus, the winding operation of the winding 38 using one flyer of the double flyer is completed. Thus, the armature coil 7 made up of ten coils 7a to 7j is formed. At the same time, the winding operation of the winding 38 using the other flyer of the double flyer is also completed. The armature coil 7 made up of ten coils 7a to 7j is formed using the other flyer as well.

Here, the winding end terminal 38b of the winding 38 wound by one flyer is connected to the same segment 41 as the winding start terminal 38a of the winding 38 wound by the other flyer.

By this configuration, when power is supplied to the armature coil 7 via the brush 22 and the segment 41, a predetermined magnetic field is generated in the armature core 6. Then, magnetic attraction force and repulsive force act between the magnetic field and the permanent magnet 4 provided on the yoke 2, and the armature 3 rotates. The segments 41 with which the brush 22 comes into slide contact are sequentially changed by the rotation, and so-called rectification in which the direction of the current flowing through the armature coil 7 is switched is performed, and the armature 3 continuously rotates.

Here, since a single wave winding is adopted as the winding structure of the armature coil 7 of the first embodiment, when an input voltage applied from the brush 22 is set to V and the total number of the segments 41 is set to K, the voltage v between the adjacent segments 41 and 41 is defined as.

$$v = 2 \times V/K \quad (1)$$

Meanwhile, when the multiple winding method is adopted as the winding structure of the armature coil 7, when an input voltage applied from the brush is set to V, the total number of the segments is set to K, and the number of the pole pairs is set to P, the voltage v between the adjacent segments is defined as.

$$v = 2 \times P \times V/K \quad (2)$$

That is, when the multiple winding method is adopted, the voltage between the segments increases by the number of the pole pairs P as compared to the case in which the single wave winding is adopted.

(Effect)

Therefore, according to the above-described first embodiment, by adopting the single wave winding as the winding structure of the armature coil 7, it is possible to increase the number of series circuits as compared to the multiple winding method. In other words, when the number of the conductors of the winding 38 is the same in the single wave winding method and the multiple winding method, it is possible to reduce the number of parallel circuits in the single wave winding method more than in the multiple winding method. Therefore, by adopting the single wave winding, it is possible to reduce the voltage between the segments 41 and 41. Therefore, it is possible to improve the rectification characteristics and extend the life expectancy of the brush 22.

Further, in the case of the single wave winding, since the winding 38 is connected to each segment 41 (in the case of the multiple winding method, the segment 41 to which the winding 38 is not connected is present), and even in the above-described embodiment (the first embodiment), it is possible to supply a desired current to the whole armature coil 7 by merely providing the two brushes 22 without providing an equalizer which short-circuits the segments 41 of the same potential with each other. Further, since an anode and a cathode are replaced by a period of a mechanical angle of 60°, it is possible to adopt a brush arrangement structure of a typical two-pole motor in which the brushes 22 are disposed to face each other around the rotary shaft 5.

Therefore, it is possible to enhance the versatility of the electric motor 1, and as a result, it is possible to reduce the manufacturing cost. Moreover, there is no need for time to connect an equalizer as in the related art, and it is possible to shorten the winding time of the winding 38 accordingly. Therefore, it is possible to further reduce the manufacturing cost of the electric motor 1, and since there is no need for an equalizer, the size of the electric motor 1 can be reduced accordingly.

Furthermore, the commutator 13 includes the resin mold body 40 formed in a substantially columnar shape, and a segment 41 that is disposed while exposed through the outer circumferential surface 40a of the resin mold body 40. Accordingly, it is possible to reduce the radial dimensions around the brush 22 and the brush holder 21.

Further, the number of slots 37 of the armature core 6 is set to the even number 20. Therefore, since it is possible to adopt a double flier type as the winding operation of the winding 38, it is possible to shorten the winding time accordingly. Therefore, it is possible to further reduce the manufacturing cost of the electric motor 1.

Moreover, although the number of slots 37 is set to an even number, the number of segments per pole pairs is an odd number. Therefore, it is possible to reduce the cogging torque and the torque ripple as in the case in which the number of slots is set to an odd number.

This will be described in more detail.

Because the electric motor 1 of the above-described first embodiment is set to six poles, the number of pole pairs is "3." Further, the number of slots of the electric motor 1 is an even number. Therefore, the relative positional relationships between the permanent magnet 4 and the slot 37 are not all the same in the circumferential direction. In addition, the degree (the number of peaks in the torque waveform) determined by the least common multiple between the number of magnetic poles and the number of slots increases. For example, comparing a 2-pole 14-slot electric motor with a 6-pole 14-slot electric motor, the degree of the 2-pole 14-slot electric motor is 14. In contrast, the degree of the 6-pole 14-slot electric motor is 42, which is three times that of the 2-pole 14-slot electric motor. Therefore, the peak of the torque waveform is lowered, and it is possible to reduce the cogging torque and the torque ripple.

(Modified Example of First Embodiment)

Further, in the above-described first embodiment, the case in which, when the winding 38 is wound around the armature core 6, a predetermined segment 41 and a predetermined slot 37 is wired by the shortest distance has been described. However, not being limited thereto, the winding 38 between a predetermined segment 41 and a predetermined slot 37 may be wired while being wound around the rotary shaft 5. This will be specifically described below with reference to FIG. 5.

Figure 5:
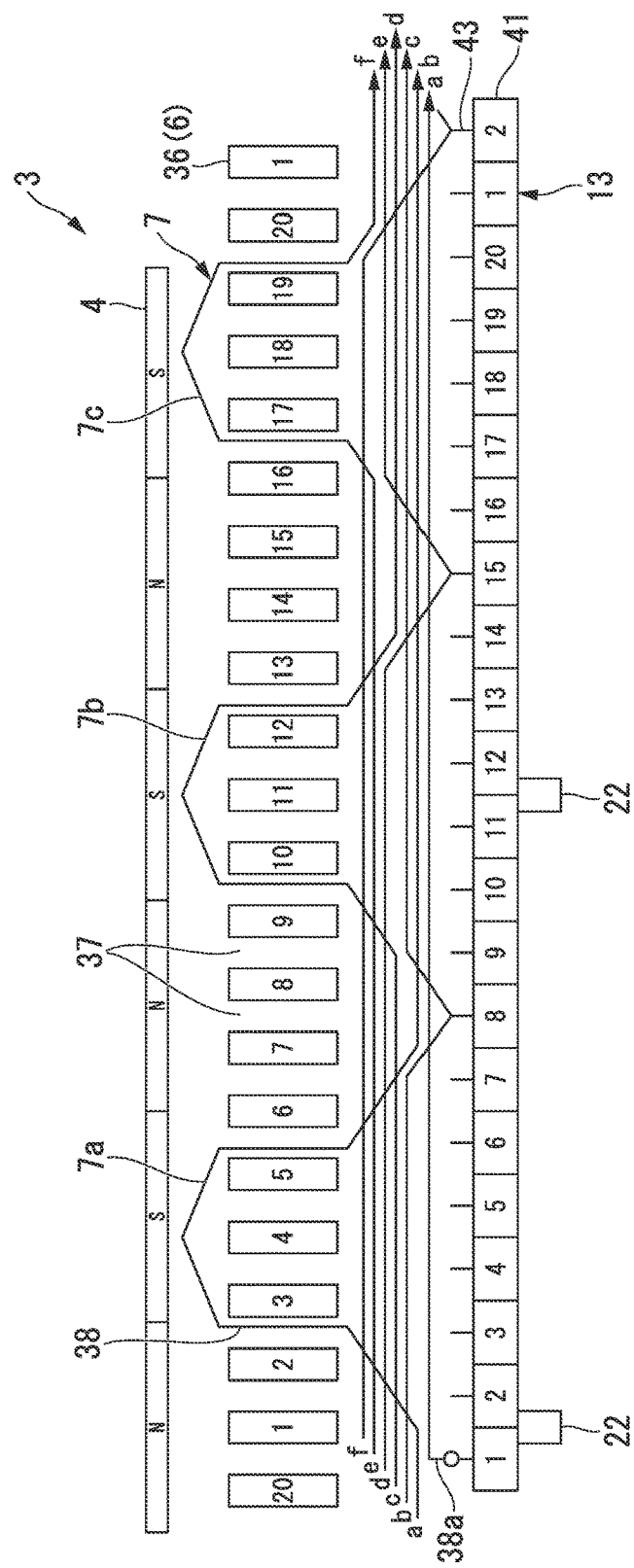
FIG. 5 is an exploded view of an armature according to a modified example of the first embodiment of the present invention.

FIG. 5 is an exploded view of an armature 3 according to a modified example of the first embodiment, and corresponds to FIG. 3 of the first embodiment. Further, the same aspects as the first embodiment are denoted by the same reference numerals and description thereof will not be provided.

As illustrated in the FIG. 5, the winding 38 in which the winding start terminal 38a is wound around the riser 43 of the first segment 41 is wound around the rotary shaft 5, without being directly inserted into the slot 37 between the second and third teeth 36, and thereafter, the winding 38 is inserted into the slot 37 between the second and third teeth 36. Further, the winding 38 is wound between the slot 37 and the slot 37 between the fifth and sixth teeth 36 N times to form a coil 7a.

Next, the winding 38 drawn out from the slot 37 between the fifth and sixth teeth 36 is wound around the rotary shaft 5 again, without being directly wound around the riser 43 of the eighth segment 41, and then the winding 38 is wound around the riser 43 of the eighth segment 41.

Subsequently, after the winding 38 is wound around the rotary shaft 5 again, the winding 38 is inserted into the slot 37 between the ninth and tenth teeth 36, and is wound between the slot 37 and the slot 37 between the twelfth and thirteenth teeth 36 N times to form a coil 7b.

Next, after the winding 38 is drawn out from the slot 37 between the twelfth and thirteenth teeth 36 and is wound around the rotary shaft 5, the winding 38 is wound around the riser 43 of the fifteenth segment 41.

Furthermore, after the winding 38 is wound around the rotary shaft 5 again, the winding 38 is inserted into the slot 37 between the sixteenth and seventeenth teeth 36, and is wound between the slot 37 and the slot 37 between the nineteenth and twentieth teeth 36 N times to form a coil 7c. Further, the winding 38 is wound around the rotary shaft 5 again, and thereafter, the winding 38 is wound around the riser 43 of the second segment 41.

Thus, the winding 38 wired between the armature core 6 and the segment 41 is sequentially wound between the predetermined slots 37 and around the riser 43 of a predetermined segment 41, while being entirely wound around the rotary shaft 5, thereby forming an armature coil 7 made up of ten coils 7a to 7j.

(Effect)

Therefore, according to the above-described modified example of the first embodiment, in addition to the same effects as in the above-described first embodiment, since the winding 38 wired between the armature core 6 and the segment 41 is wound around the rotary shaft 5, it is possible to intensively wire the winding 38 between the armature core 6 and the segment 41 around the rotary shaft 5. That is, as compared to the case of connecting the armature core 6 and the segment 41 by the winding 38 in the shortest distance, it is possible to suppress the thick winding of the winding 38 between them. Thus, the size of the armature 3 can be reduced.

(Second Embodiment) (Electric Motor Device)

Next, a second embodiment of the present invention will be described on the basis of in FIGS. 6 to 9.

Figure 6:
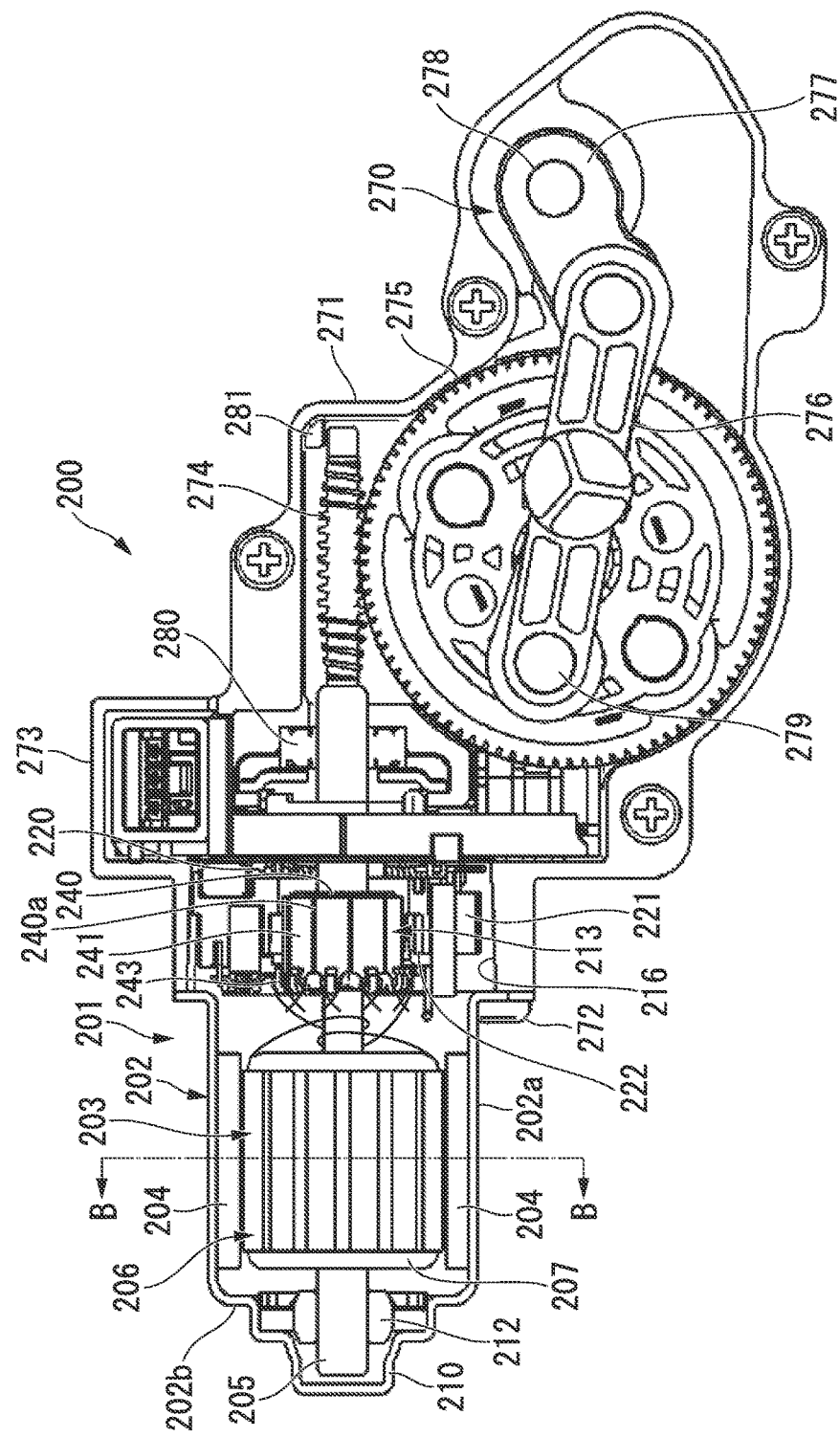
FIG. 6 is a cross-sectional view illustrating a configuration of an electric motor device according to a second embodiment of the present invention.
Figure 7:
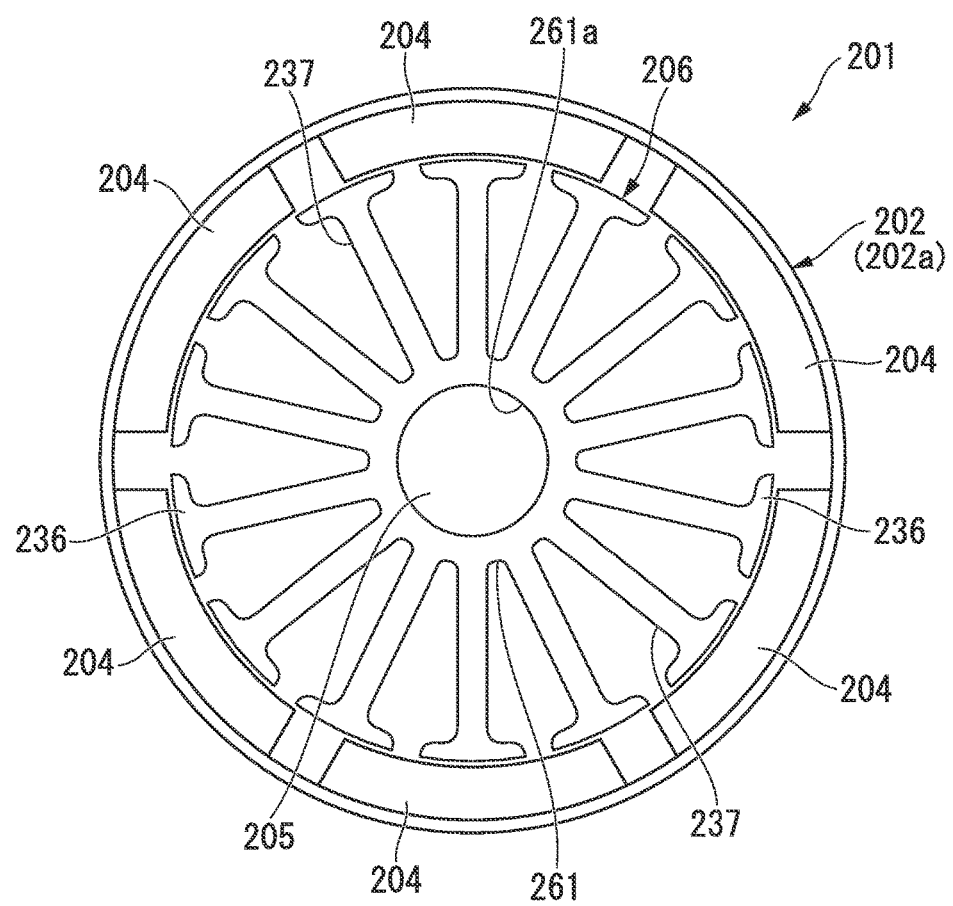
FIG. 7 is a cross-sectional view taken along the line B-B of FIG. 6 in which an armature coil is not illustrated.

FIG. 6 is a cross-sectional view illustrating the configuration of an electric motor device 200. FIG. 7 is a cross-sectional view taken along the line B-B in FIG. 6 in which an armature coil 207 is not illustrated.

As illustrated in FIGS. 6 and 7, the electric motor device 200 of the second embodiment, for example, is provided on a back door of a motor vehicle, and is used to rotate a rear wiper which wipes a rear window glass of the motor vehicle (neither is illustrated).

The electric motor device 200 is equipped with an electric motor unit 201 disposed on one side (a left side in FIG. 6), a transmission mechanism 270 disposed on the other side (a right side in FIG. 6) and a gear case 271 that houses the transmission mechanism 270.

The electric motor unit 201 is a so-called DC motor with a brush and is equipped with an armature 203 which is provided in a yoke 202 having the bottomed cylindrical shape in a freely rotatable manner.

(Yoke)

Six permanent magnets 204 having tile shapes are disposed on an inner surface of a circumferential wall 202a of the yoke 202 in the circumferential direction. The permanent magnets 204 are disposed with the magnetic poles sequentially disposed in the circumferential direction.

A boss section 210 projecting toward the axial outer side is formed in substantially a radial center in an end portion (a bottom portion) 202b of the yoke 202. A bearing 212 for supporting an end of the rotary shaft 205 in a freely rotatable manner is fitted into the boss section 210.

(Armature)

The armature 203 is configured to include an armature core 206 which is externally fitted and fixed to the rotary shaft 205, an armature coil 207 wound around the armature core 206, and a commutator 213 disposed on the other end side (a right side in FIG. 1) of the rotary shaft 205.

The armature core 206 is formed by axially stacking a plurality of metal plates or by pressure-molding a soft magnetic powder. The armature core 206 has a core main body 261 having a substantially annular shape which is externally fitted and fixed to the rotary shaft 205. The rotary shaft 205 is press-fitted into an insertion hole 61a formed in the core main body 261.

On the radial outer side of the core main body 261, fourteen teeth 236 having substantially T shapes when viewed in an axial plan are formed at equal intervals in the circumferential direction. A dovetail-shaped slot 237 is formed between the adjacent teeth 236. The slots 237 extend in the axial direction, and fourteen slots are formed at equal intervals in the circumferential direction.

Further, an enameled winding 238 (see FIG. 8) communicates with the slot 237, and the winding 238 is wound from the top of an insulator (not illustrated) mounted on the teeth 236. As a result, a plurality of armature coils 207 is formed on an outer circumference of the armature core 206. Further, the method of winding the winding 238 will be described later in detail.

A commutator 213 disposed on the other end side of the rotary shaft 205 includes a resin mold body 240 which is externally fitted and fixed to the rotary shaft 205 and is formed in a substantially columnar shape, and fourteen segments 241 which are disposed while exposed through the outer circumferential surface 240a of the resin mold body 240. That is, the electric motor unit 201 of the second embodiment is a so-called 6-pole 14-slot 14-segment DC motor which has the six permanent magnets (the magnetic poles) 204, the fourteen slots 237 and the fourteen segments 241.

The segments 241 are formed by an elongated plate-shaped metal piece in the axial direction, and are fixed in parallel at equal intervals in a circumferential direction while insulated from each other. At the end portion of the segment 241 on the side facing the armature core 206, a riser 243 which is bent in the form of being folded to the outer diameter side is integrally formed. The winding 238 is wound around the riser 243, for example, in an a winding method (see FIG. 6).

The electric motor unit 201 having such a configuration is fastened and fixed to a gear case 271 by a bolt 272 in a state in which an opening portion 202c of the yoke 202 is directed to the gear case 271 side. In the gear case 271, a brush holder housing recess 216 is formed at the position to which the electric motor unit 201 is attached. The electric motor unit 201 is attached so that the commutator 213 faces the brush holder housing recess 216 of the gear case 271.

In addition, the holder stay 220 is attached to the brush holder housing recess 216.

The holder stay 220 is made of a resin and is formed in substantially a disc shape. The two brush holders 221 are fixed to the inner surface of the holder stay 220.

The brush holders 221 are formed in rectangular parallelepiped box shapes. The brush holders 221 are disposed so that their longer direction extends in the radial direction, and are disposed to face each other around the rotary shaft 205. The brushes 222 are built in the brush holder 221 to freely move back and forth with respect to the commutator 213 while biased via a coil spring (not illustrated).

Since the tip portion of the brush 222 is biased by a coil spring (not illustrated), it is in slide contact with the segment 241 of the commutator 213. The brush 222 is electrically connected to a connector unit 273 provided on the gear case 271 via a pigtail. A connector extending from an external power source (not illustrated) can be fitted to the connector unit 273. Also, voltage from an external power source (not illustrated) is applied to the armature coil 207 via the connector unit 273, the pigtail (not illustrated), the brush 222 and the segment 241.

(Transmission Mechanism)

The transmission mechanism 270 is configured to include a worm shaft 274 housed in the gear case 271, a worm wheel 275 meshed with the worm shaft 274, a first connecting plate 276 connected to the worm wheel 275, and a second connecting plate 277 connected to the first connecting plate 276.

The electric motor unit 201 side of the worm shaft 274 is supported by a bearing 280 provided in the gear case 271 in a freely rotatable manner. Meanwhile, the end portion of the worm shaft 274 on the side opposite to the electric motor unit 201 is supported by a load receiving unit 281 which receives a reaction force generated by the meshing with the worm wheel 275.

The first connecting plate 276 is a member formed in an elongated plate shape. One end side of the first connecting plate 276 is pivotally connected to a connecting shaft 279 provided on the worm wheel 275. Further, the other end side of the first connecting plate 276 is pivotally connected to one end side of the second connecting plate 277. An output shaft 278 is attached to the other end side of the second connecting plate 277 in a state in which the relative rotation with the second connecting plate 277 is restricted.

By this configuration, when the worm wheel 275 rotates, the connecting shaft 279 provided on the worm wheel 275 rotationally moves in the circumferential direction of the worm wheel 275. Moreover, by the rotational movement of the connecting shaft 279, the first connecting plate 276 and the second connecting plate 277 that are connected to each other in a freely rotatable manner perform the link operation. Also, by the link operation, the output shaft 278 attached to the second connecting plate 277 pivots.

The output shaft 278 reciprocally pivots once by one rotation of the worm wheel 275 to which the connecting shaft 279 is attached. By the rotation of the output shaft 278, a rear wiper (not illustrated) attached to the output shaft 278 pivots.

(Winding Structure of Armature Coil)

Next, the winding structure of the armature coil 207 will be described on the basis of FIGS. 8 and 9.

Figure 8:
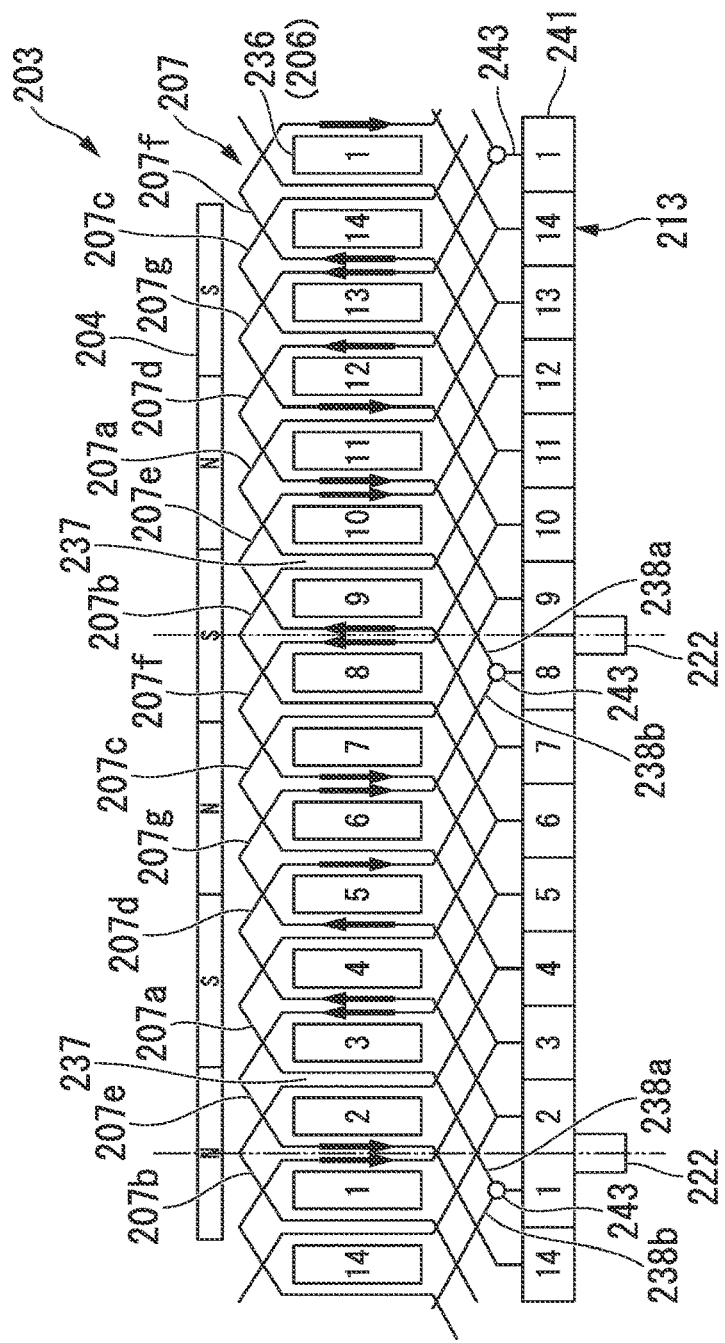
FIG. 8 is an exploded view of an armature according to a second embodiment of the present invention.
Figure 9:
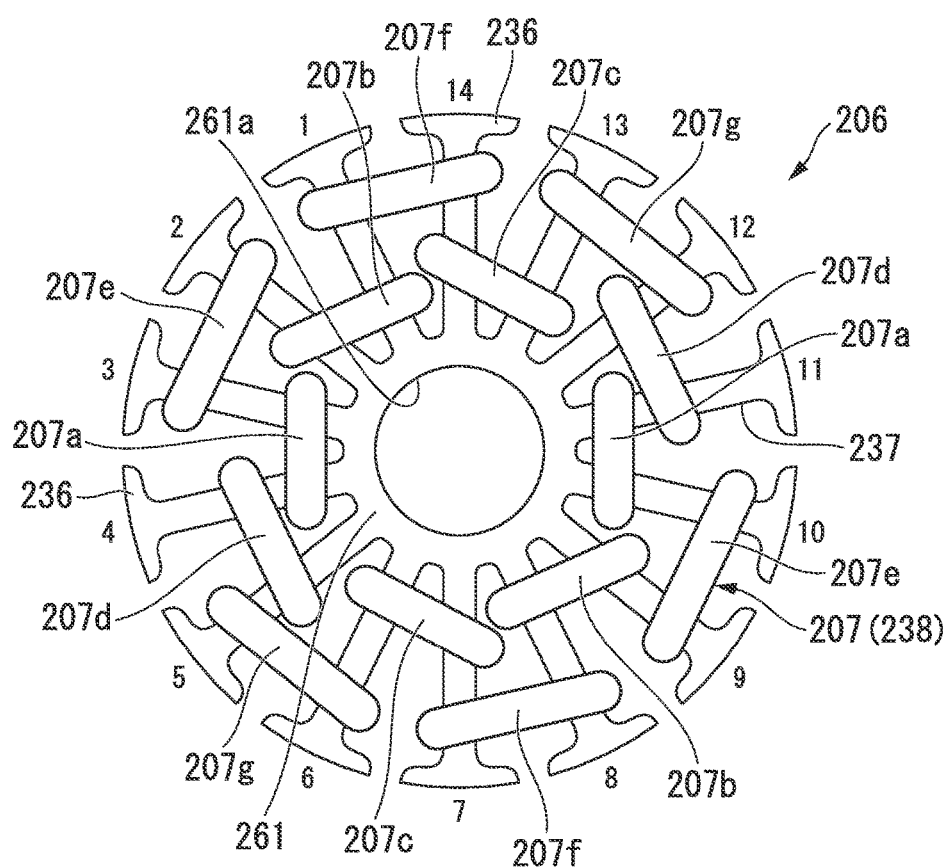
FIG. 9 is an explanatory view in which a winding state of the armature coil on the armature core according to a second embodiment of the present invention is viewed from the axial direction.

FIG. 8 is an exploded view of the armature 203, and a gap between the adjacent teeth 236 corresponds to the slot 237. FIG. 9 is an explanatory view in which a winding state of the armature coil 207 on the armature core 206 is viewed in the axial direction. Further, FIGS. 8 and 9 correspond to FIGS. 3 and 4 of the above-described first embodiment, respectively.

Here, the armature coil 207 is formed by winding the winding 238 between the predetermined slots 237 in a so-called single wave winding. Further, the armature coil 207 is formed by winding the winding 238 in the double flyer method. That is, the two winding start terminals 238a of the winding 238 are present, and are wound around a riser 243 of the first segment 241 and a riser 243 of the eighth segment 241 that are present at point-symmetric positions around the rotary shaft 205.

In the following description, since the routing procedure of the winding 238 which begins to be wound from the first segment 241 and the winding 238 which begins to be wound from the eighth segment 241 is point-symmetric around the rotary shaft 205, only the winding 238 which begins to be wound from the first segment 241 will be described, and the winding 238 which begins to be wound from the eighth segment 241 is denoted by the same reference numeral of the armature coil 207 formed by the winding 238 which begins to be wound from the first segment 241, and the description thereof will not be provided.

First, the winding 238 in which the winding start terminal 238a is wound around the riser 243 of the first segment 241 is inserted into the slot 237 between the second and third teeth 236, and is wound between the slot 237 and the slot 237 between the fourth and fifth teeth 236 N times to form a coil 207a. Next, the winding 238 is drawn out from the slot 237 between the fourth and fifth teeth 236 and is wound around the riser 243 of the sixth segment 241.

Subsequently, the winding 238 is inserted into the slot 237 between the seventh and eighth teeth 236, and is wound between the slot 237 and the slot 237 between the ninth and tenth teeth 236 N times to form a coil 207b. Next, the winding 238 is drawn out from the slot 237 between the ninth and tenth teeth 236 and is wound around the riser 243 of the eleventh segment 241.

Subsequently, the winding 238 is inserted into the slot 237 between the twelfth and thirteenth teeth 236, and is wound between the slot 237 and the slot 237 between the fourteenth and first teeth 236 N times to form a coil 207c. Next, the winding 238 is drawn out from the slot 237 between the fourteenth and first teeth 236 and is wound around the riser 243 of the second segment 241.

Subsequently, the winding 238 is inserted into the slot 237 between third and fourth teeth 236, and is wound between the slot 237 and the slot 237 between the fifth and sixth teeth 236 N times to form a coil 207d. Next, the winding 238 is drawn out from the slot 237 between the fifth and sixth teeth 236 and is wound around the riser 243 of the seventh segment 241.

Subsequently, the winding 238 is inserted into the slot 237 between the eighth and ninth teeth 236, and is wound between the slot 237 and the slot 237 between the tenth and eleventh teeth 236 N times to form a coil 207e. Next, the winding 238 is drawn out from the slot 237 between the tenth and eleventh teeth 236 and is wound around the riser 243 of the twelfth segment 241.

Subsequently, the winding 238 is inserted into the slot 237 between the thirteenth and fourteenth teeth 236, and is wound between the slot 237 and the slot 237 between the first and second teeth 236 N times to form a coil 207f. Next, the winding 238 is drawn out from the slot 237 between the first and second teeth 236 and is wound around the riser 243 of the third segment 241.

Subsequently, the winding 238 is inserted into the slot 237 between the fourth and fifth teeth 236, and is wound between the slot 237 and the slot 237 between the sixth and seventh teeth 236 N times to form a coil 207g. Next, the winding 238 is drawn out from the slot 237 between the sixth and seventh teeth 236 and is wound around the riser 243 of the eighth segment 241.

Thus, the winding operation of the winding 238 using one flyer of the double flyer is completed. Thus, the armature coil 207 made up of seven coils 207a to 207g is formed. At the same time, the winding operation of the winding 238 using the other flyer of the double flyer is also completed. The armature coil 207 made up of seven coils 207a to 207g is formed when the other flyer is used as well.

Here, the winding end terminal 238b of the winding 238 wound by one flyer is connected to the same segment 241 as the winding start terminal 238a of the winding 238 wound by the other flyer.

Therefore, according to the second embodiment, it is possible to achieve the same effect as the first embodiment.
(Modified Example of Second Embodiment)

Further, in the above-described second embodiment, the case in which, when the winding 238 is wound around the armature core 206, an interval between a predetermined segment 241 and a predetermined slot 237 is wired by the shortest distance has been described. However, the second embodiment is not limited thereto, and the winding 238 between a predetermined segment 241 and a predetermined slot 237 may be wired while being wound around the rotary shaft 205. This will be specifically described with reference to FIG. 10 below.

Figure 10:
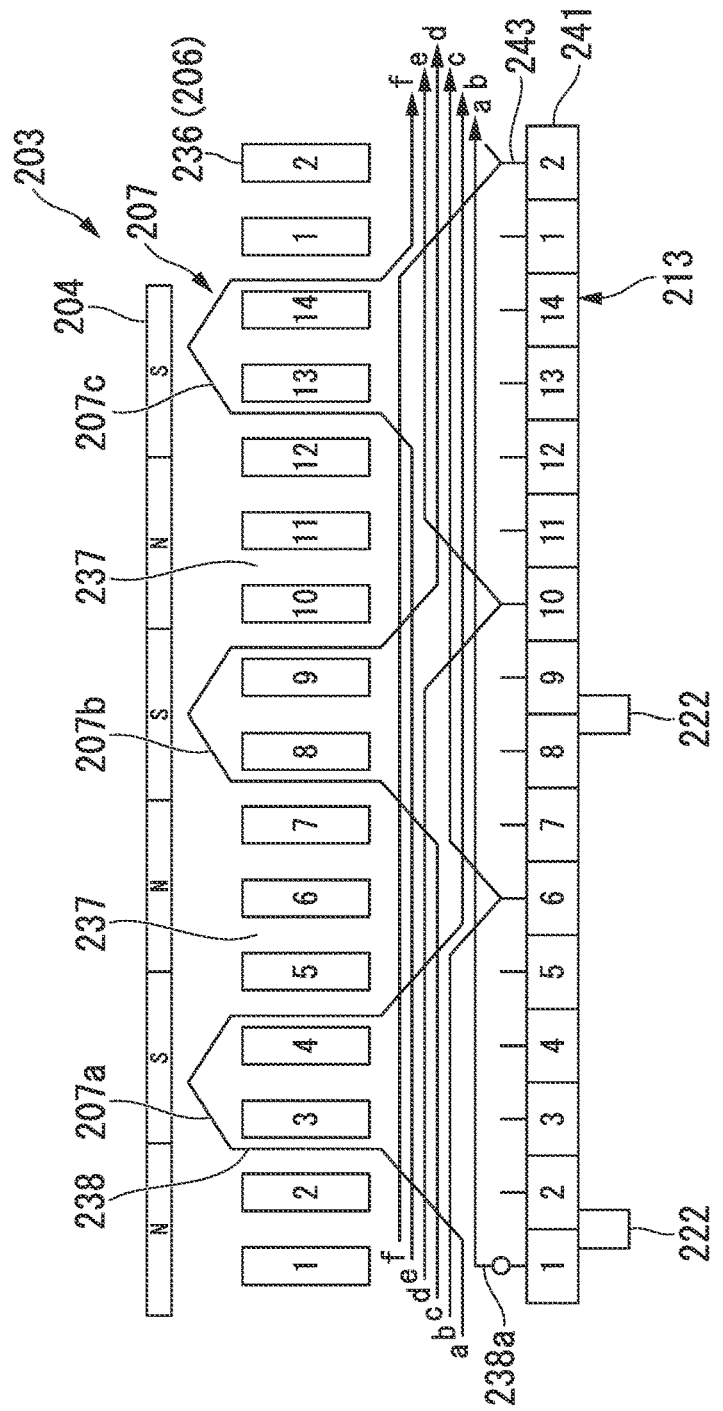
FIG. 10 is an exploded view of an armature according to a modified example of the second embodiment of the present invention.

FIG. 10 is an exploded view of an armature 203 according to a modified example of the second embodiment, and corresponds to FIG. 8 of the second embodiment. Further, the same aspects as the first embodiment are denoted by the same reference numerals and description thereof will not be provided.

As illustrated in the FIG. 10, a winding 238 in which a winding start terminal 238a is wound around a riser 243 of the first segment 241 is wound around a rotary shaft 205 without being directly inserted into a slot 237 between the second and third teeth 236, and then the winding 238 is inserted into the slot 237 between the second and third teeth 236. Further, the winding 238 is wound between the slot 237 and the slot 237 between the fourth and fifth teeth 236 N times to form a coil 207a.

Next, the winding 238 drawn out from the slot 237 between the fourth and fifth teeth 236 is wound around the rotary shaft 205 again without being directly wound around the riser 243 of the sixth segment 241, and then the winding 238 is wound around the riser 243 of the sixth segment 241.

Subsequently, after the winding 238 is wound around the rotary shaft 205 again, the winding 238 is inserted into the slot 237 between the seventh and eighth teeth 236, and is wound between the slot 237 and the slot 237 between the ninth and tenth teeth 236 N times to form a coil 207b.

Next, after the winding 238 is drawn out from the slot 237 between the ninth and tenth teeth 236 and is wound around the rotary shaft 205, the winding 238 is wound around the riser 243 of the tenth segment 241.

Furthermore, after the winding 238 is wound around the rotary shaft 205 again, the winding 238 is inserted into the slot 237 between the twelfth and thirteenth teeth 236, and is wound between the slot 237 and the slot 237 between the fourteenth and first teeth 236 N times to form a coil 207c. Further, the winding 238 is wound around the rotary shaft 205 again, and then the winding 238 is wound around the riser 243 of the second segment 241.

Thus, the winding 238 is sequentially wound between the predetermined slots 237 and around the riser 243 of a predetermined segment 241, while winding the winding 238 wired between the armature core 206 and the segment 241 entirely wound around the rotary shaft 205, thereby forming an armature coil 207 made up of seven coils 207a to 207g.

Therefore, according to the modified example, in addition to the same effects as in the above-described second embodiment, it is possible to suppress the thick winding of the winding 238 between the armature core 206 and the segment 241. Thus, the size of the armature 203 can be reduced.
(Third Embodiment) (Motor with Speed Reduction Gear)

Next, a third embodiment of the present invention will be described on the basis of FIGS. 11 to 15.

Figure 11:
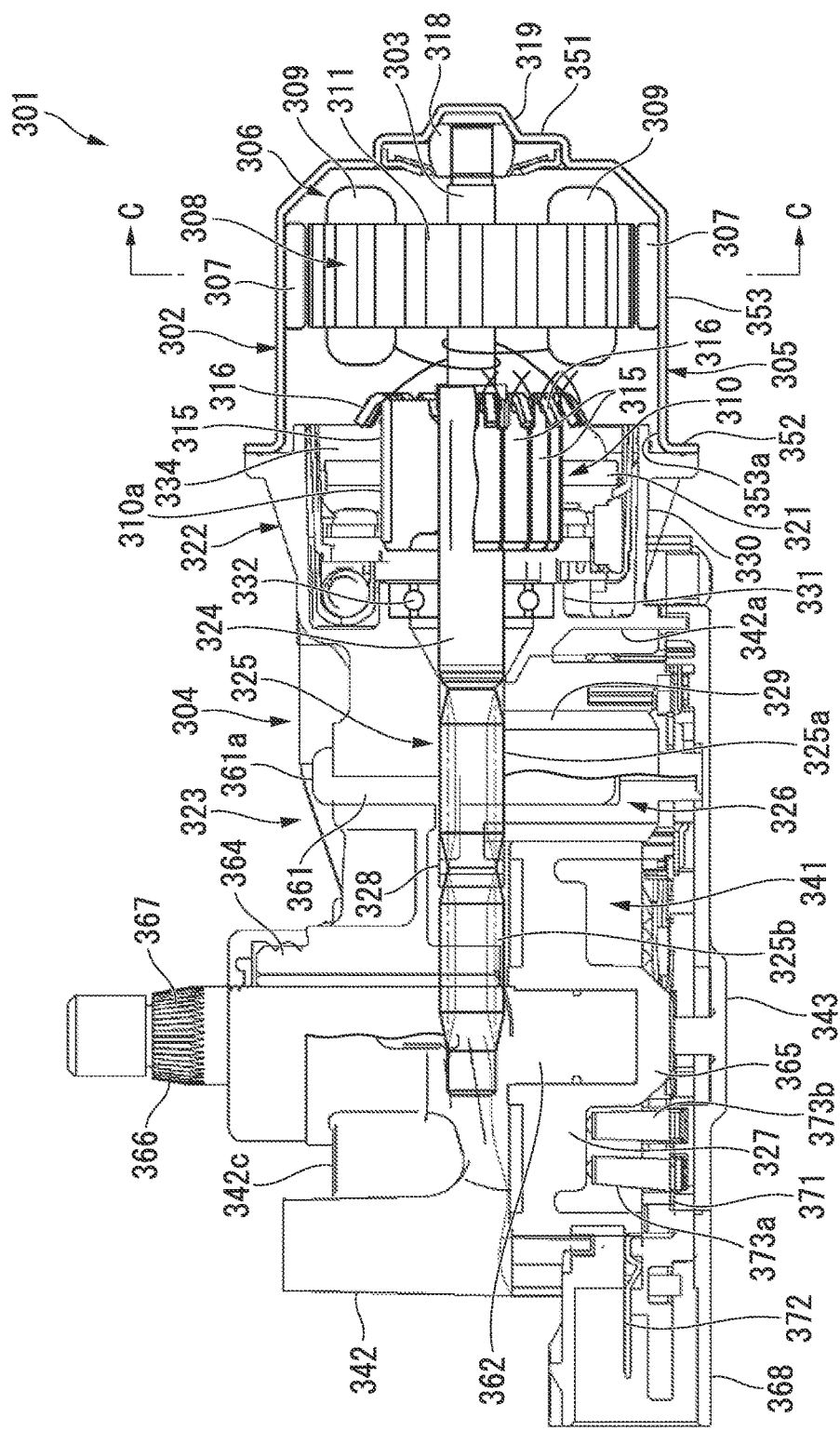
FIG. 11 is a vertical cross-sectional view of a motor with a speed reduction gear according to a third embodiment of the present invention.
Figure 12:
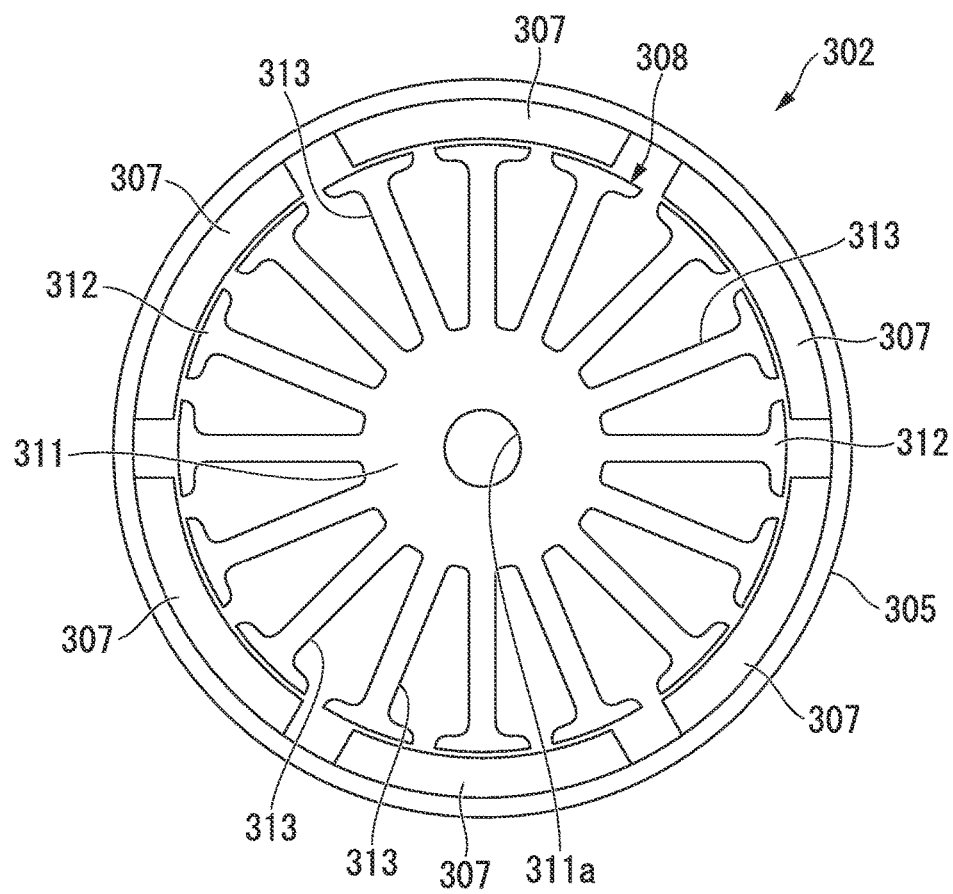
FIG. 12 is a cross-sectional view taken along the line C-C of FIG. 11 in which the armature coil is not illustrated

FIG. 11 is a longitudinal cross-sectional view of a motor with a speed reduction gear 301. FIG. 12 is a cross-sectional view taken along the line C-C in FIG. 11 in which an armature coil 309 is not illustrated.

As illustrated in FIGS. 11 and 12, the motor with the speed reduction gear 301, for example, is used for driving a wiper of a motor vehicle, and is equipped with an electric motor 302, and a speed reduction mechanism 304 connected to a rotary shaft 303 of the electric motor 302. The electric motor 302 has a bottomed cylindrical yoke 305, and an armature 306 which is provided in the yoke 305 in a freely rotatable manner.

A cylindrical portion 353 of the yoke 305 is formed in a substantially cylindrical shape, and six segmented permanent magnets 307 are provided on the inner circumferential surface of the cylindrical portion 353.

In a bottom wall (an end portion) 351 of the yoke 305, a bearing housing 319 which projects toward the axial outer side is formed in the radial center, and a sliding bearing 318 for supporting one end of the rotary shaft 303 in a freely rotatable manner is provided. The sliding bearing 318 has an alignment function of the rotary shaft 303.

An outer flange section 352 is provided in an opening portion 353a of the cylindrical portion 353. Bolt holes (not illustrated) are formed on the outer flange section 352. Bolts (not illustrated) are inserted through the bolt holes and are screwed into bolt holes (not illustrated) formed in the gear housing 323 to be described later of the reduction mechanism 304, and thus the yoke 305 is fastened and fixed to the speed reduction mechanism 304.

The armature 306 is equipped with an armature core 308 which is externally fitted and fixed to the rotary shaft 303, an armature coil 309 which is wound around the armature core 308, and a commutator 310 which is disposed on the other end side of the rotary shaft 303. The armature core 308 is formed by axially stacking a plate member of a magnetic material punched by press working or the like (a laminated core) or by pressure-molding a soft magnetic powder (a dust core), and has a substantially cylindrical core main body 311.

A through-hole 311a for press-fitting the rotary shaft 303 is formed in substantially the radial center of the core main body 311. Further, sixteen teeth 312 having substantially T shapes when viewed in the axial plan are radially provided on the outer circumference of the core main body 311. By radially providing the teeth 312 on the outer circumference of the core main body 311, sixteen dovetail-shaped slots 313 are formed between the adjacent teeth 312. The armature coil 309 is wound around the armature core 308 via the slots 313.

On the other side of the rotary shaft 303 from the armature core 308, a substantially columnar commutator 310 is externally fitted and fixed. The sixteen segments 315 formed of a conductive material are attached to the outer circumferential surface 310a of the commutator 310. The segments 315 are made of an axially long plate-shaped metal piece and are fixed in parallel at equal intervals in the circumferential direction while insulated from one another.

Thus, the electric motor 302 becomes a so-called 6-pole 16-slot 16-segment DC motor in which the six permanent magnets 307 (the number of magnetic poles is six), the sixteen slots 313 and the sixteen segments 315 are set.

Further, at an end portion of each segment 315 on the side facing the armature core 308, a riser 316 which is bent in the form of being folded to the outer diameter side is integrally formed. The distal end portion of the armature coil 309 is wound around the riser 316, for example, in an a winding method (see, FIG. 11), and is fixed by fusing. As a result, the segment 315 is electrically conducted to the armature coil 309 corresponding thereto.

The commutator 310 having such a configuration faces the gear housing 323 of the speed reduction mechanism 304. The gear housing 323 is configured to include an aluminum die cast housing main body 342 that is formed in substantially a box shape having an opening portion 342a on one side and houses a gear train 341 of the speed reduction mechanism 304, and a bottom plate 343 made of a resin which closes the opening portion 342a of the housing main body 342. On a side of the housing main body 342 facing the electric motor 302, a brush housing portion 322 is integrally molded, and the commutator 310 of the electric motor 302 faces the brush housing portion 322.

The brush housing portion 322 is formed in a concave shape on the side of the gear housing 323 facing the electric motor 302. A holder stay 334 is provided inside the brush housing portion 322.

Brush holders (not illustrated) are provided at three circumferential positions of the holder stay 334. The brushes 321 are housed in each of the holder stays 334 (see FIG. 13) to be freely movable back and forth. Each brush 321 is biased toward the commutator 310 side via a spring (not illustrated), and its tip comes into slide contact with the segment 315 of the commutator 310.

Figure 13:
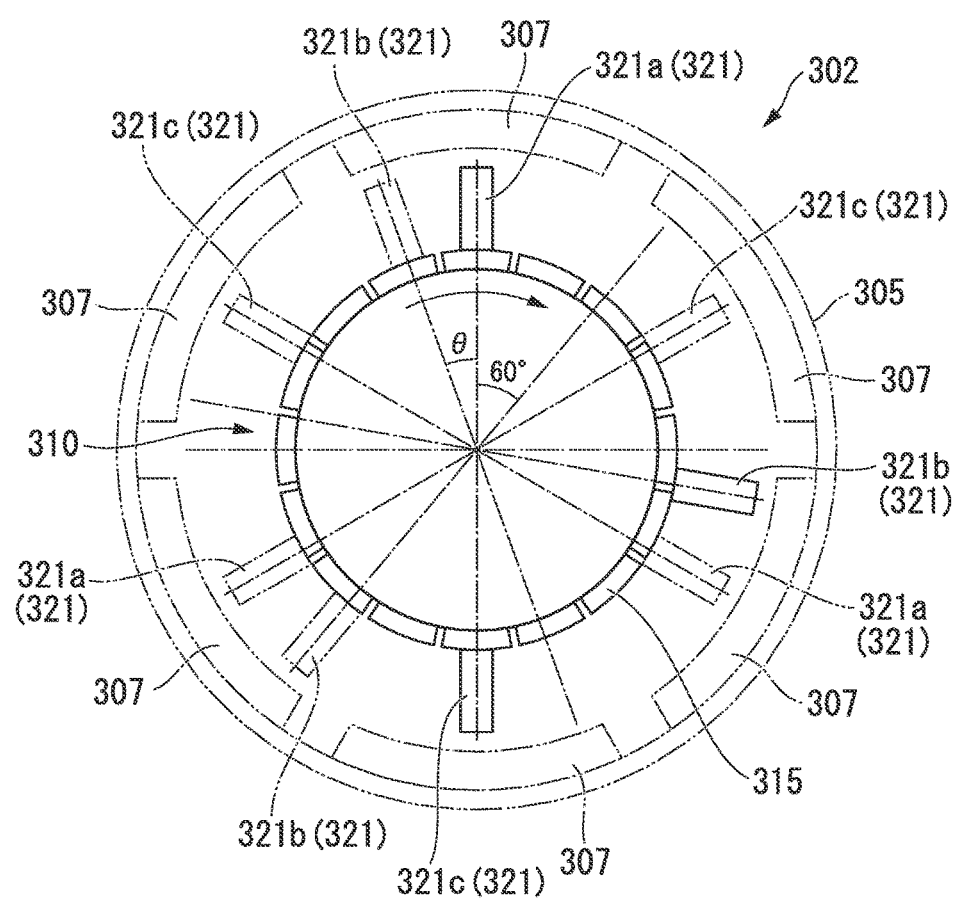
FIG. 13 is an explanatory view illustrating an arrangement of the brush according to the third embodiment of the present invention.

FIG. 13 is an explanatory view illustrating the arrangement of the brush 321.

As illustrated in FIG. 13, the brush 321 is configured to include a low-speed brush 321a and a high-speed brush 321b connected to an anode side, and a common brush 321c which is commonly used with the low-speed brush 321a and the high-speed brush 321b and is connected to a cathode side. The low-speed brush 321a and the common brush 321c are disposed opposite around the rotary shaft 303.

Further, the low-speed brush 321a may be disposed at any location, as long as it is located at a position of a mechanical angle interval of 120°. That is, in FIG. 13, it is also possible to dispose the low-speed brush 321a at a position apart from the common brush 321c by a mechanical angle of 60° (see a two-dot chain line in FIG. 13).

Further, the common brush 321c may also be disposed at any location, as long as it is located at a position of a mechanical angle interval of 120°. That is, in FIG. 13, it is also possible to dispose the common brush 321c at a position apart from the low-speed brush 321a by a mechanical angle of 60° (see a two-dot chain line in FIG. 13).

Meanwhile, the high-speed brush 321b is disposed apart from the position at which the low-speed brush 321a can be disposed by an angle θ in the circumferential direction. That is, the high-speed brush 321b is disposed at a position advanced by the angle θ from the low-speed brush 321a.

The high-speed brush 321b may also be disposed at any location, as long as it is located at a position of a mechanical angle interval of 120°. That is, it is possible to dispose each high-speed brush 321b at a position which is circumferentially advanced by an angle θ from the position at which the low-speed brush 321a can be disposed (see the two-dot chain line in FIG. 13).

Further, in the third embodiment, although the case in which the common brush 21c is set as the cathode side, and the low-speed brush 21a and the high-speed brush 21b are set as the anode side has been described, the anode side and the cathode side may be reversed.

(Speed Reduction Mechanism)

Returning to FIG. 11, in the gear housing 323 to which the electric motor 302 configured in this way is attached, a gear train 341 is housed in the housing main body 342. The gear train 341 is configured to include a worm shaft 325 connected to the rotary shaft 303 of the electric motor 302, a pair of stepped gears 326 and 326 meshed with the worm shaft 325, and a spur gear 327 meshed with the stepped gear 326.

The worm shaft 325 is connected to the rotary shaft 303 at one end, and is rotatably supported by the housing main body 342 at the other end. A connecting portion 324 configured to be connected to the worm shaft 325 and the rotary shaft 303, that is, the other end of the rotary shaft 303, is rotatably supported by a rolling bearing 332 which is provided on the bottom wall 331 of the brush housing portion 322 formed in the housing main body 342.

In addition, the worm shaft 325 has a first threaded portion 325a and a second threaded portion 325b which are screws opposite to each other. The first threaded portion 325a, and second threaded portion 325b are formed in a single-threaded screw or a two-threaded screw. However, the first threaded portion 325a and the second threaded portion 325b may be formed in three or more-threaded screw.

A pair of stepped gears 326 and 326 are disposed on both sides with the worm shaft 325 interposed therebetween, and the pair of stepped gears 326 and 326 are meshed with each of the first threaded portion 325a and the second threaded portion 325b.

A pair of stepped gears 326 are configured by integrally molding the worm wheel 328 meshed with the worm shaft 325, and a small-diameter gear 329 having a smaller diameter than the worm wheel 328. A parallel shaft 361 is press-fitted to the radial center of the stepped gear 326. The parallel shaft 361 protrudes to the opposite side of the small-diameter gear 329, and the protruding end portion 361a is rotatably supported by the housing main body 342. Meanwhile, the tip of the small-diameter gear 329 that is present on the side opposite to the end portion 361a of the parallel shaft 361 is rotatably supported by the bottom plate 343.

In this way, both ends of a pair of stepped gears 326 are pivotally supported by the housing main body 342 and the bottom plate 343. Further, each of a pair of stepped gears 326 and 326 rotates in the same direction to transmit the rotation of the worm shaft 325 to the spur gear 327. That is, a so-called Marshall mechanism is constituted by the worm shaft 325 and the pair of stepped gears 326 and 326, and the thrust force applied to the worm shaft 325 is offset by the pair of stepped gears 326 and 326.

The spur gear 327 is meshed with the small-diameter gear 329 of the stepped gear 326. In the radial center of the spur gear 327, a boss section 365 protruding toward the bottom plate 343 side is formed. The boss section 365 is rotatably supported by the bottom plate 343. Also, the output shaft 362 is press-fitted to the boss section 365. The output shaft 362 protrudes from the bottom wall (an end portion) 342c of the housing main body 342. On the bottom wall 342c of the housing main body 342, in a part corresponding to the output shaft 362, a boss section 363 is formed to project outward. The boss section 363 is provided with a sliding bearing 364 for supporting the output shaft 362 in a freely rotatable manner.

In a portion of the output shaft 362 protruding from the housing main body 342, a tapered portion 366 gradually tapering toward the tip is formed. Serrations 367 are formed on the tapered portion 366. Thus, for example, it is possible to connect the external mechanism for driving a wiper or the like and the output shaft 362.

In addition, a connector 368 is provided on the side walls 342b of the housing main body 342 to protrude in the axial direction of the rotary shaft 303. The connector 368 is connected to a controller (not illustrated) to supply the electric power of the external power source (not illustrated) to the electric motor 302.

A substrate 371 is disposed on an inner surface 343a of the bottom plate 343 which closes the opening portion 342a of the housing main body 342. The substrate 371 is provided with a terminal 372 for electrically connecting the connector 368 with the electric motor 302. Also, contactors 373a and 373b are provided on the substrate 371. The contactors 373a and 373b are sliding contacts for detecting a rotational position of the spur gear 327. A contact plate (not illustrated) is provided in a part in which the contactors 373a and 373b of the spur gear 327 come into slide contact with each other.

Further, the rotational position of the output shaft 362 can be detected by a change in the contact position between the contactors 373a and 373b and a contact plate (not illustrated) or by contact/non-contact, along with the rotation of the spur gear 327, that is, the output shaft 362. The signals detected by the contactors 373a and 373b are output to the controller (not illustrated) via the terminal 372, and the rotation control of the electric motor 302 is performed.

(Winding Structure of Armature Coil)

Next, the winding structure of the armature coil 309 will be described on the basis of FIGS. 14 and 15.

Figure 14:
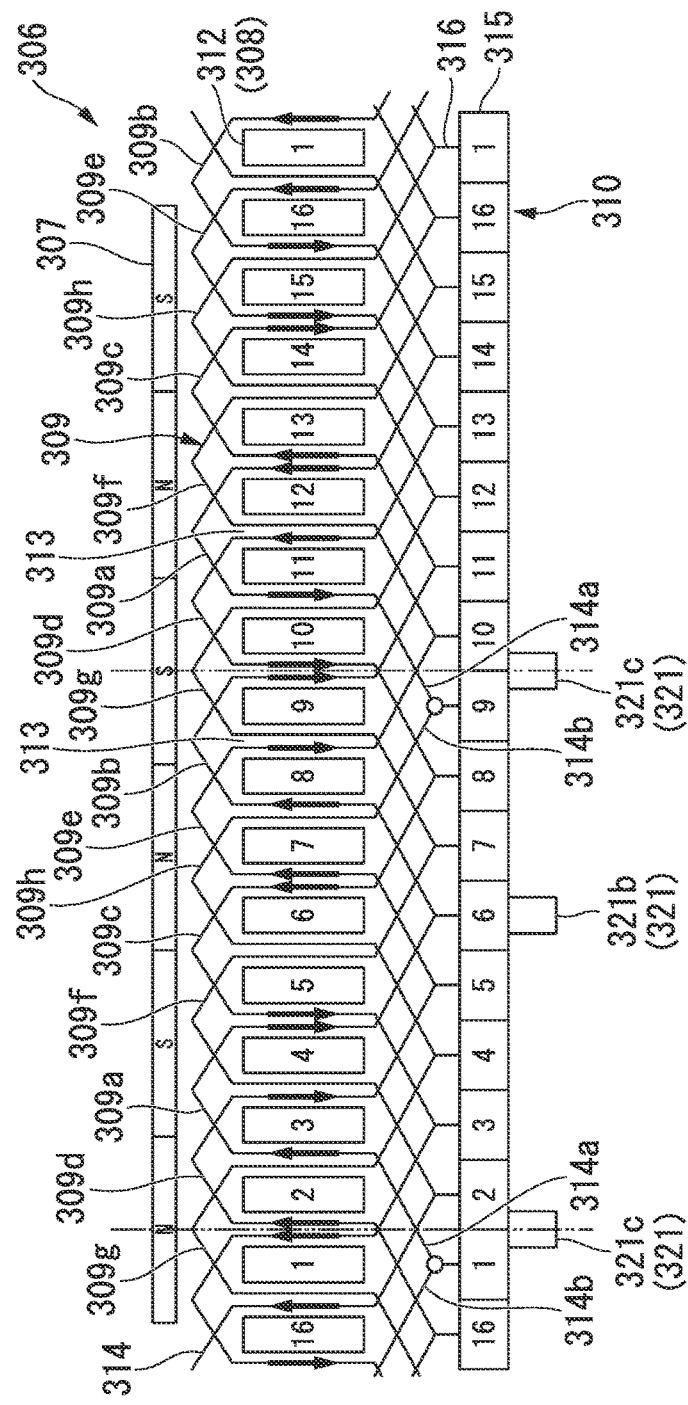
FIG. 14 is an exploded view of the armature according to the third embodiment of the present invention.
Figure 15:
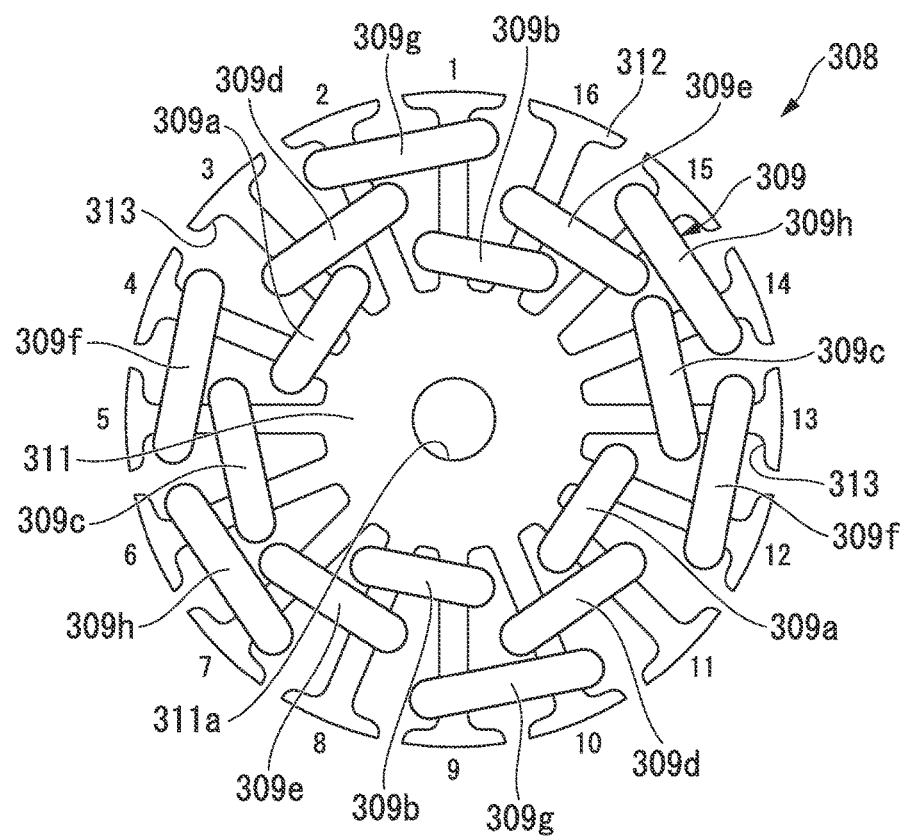
FIG. 15 is an explanatory view in which a winding state of the armature coil on the armature core according to a third embodiment of the present invention is viewed in the axial direction.

FIG. 14 is an exploded view of the armature 306, and a gap between the adjacent teeth 312 corresponds to a slot 313. FIG. 15 is an explanatory view in which a winding state of the armature coil 309 on the armature core 308 is viewed in the axial direction. Further, FIGS. 14 and 15 correspond to FIGS. 3 and 4 of the above-described first embodiment, respectively.

Here, the armature coil 309 is formed by winding the winding 314 between predetermined slots 313 in a so-called single wave winding. Further, the armature coil 309 is formed by winding the winding 314 in the double flyer method. That is, two winding start terminals 314a of the winding 314 are present and are wound around a riser 316 of the first segment 315 and a riser 316 of the ninth segment 315 that are present at point-symmetric positions around the rotary shaft 303.

In the following description, since the routing order of the winding 314 which begins to be wound from the first segment 315 and the winding 314 which begins to be wound from the ninth segment 315 is point symmetry around the rotary shaft 303, only the winding 314 which begins to be wound from the first segment 315 will be described, and the winding 314 which begins to be wound from the ninth segment 315 is denoted by the same reference numeral of the armature coil 309 formed by the winding 314 which begins to be wound from the first segment 315 and the description thereof will not be provided.

First, the winding 314 in which the winding start terminal 314a is wound around the riser 316 of the first segment 315 is inserted into the slot 313 between the second and third teeth 312, and is wound between the slot 313 and the slot 313 between the fourth and fifth teeth 312 N times to form a coil 309a. Next, the winding 314 is drawn out from the slot 313 between the fourth and fifth teeth 312 and is wound around the riser 316 of the sixth segment 315.

Subsequently, the winding 314 is inserted into the slot 313 between the seventh and eighth teeth 312, and is wound between the slot 313 and the slot 313 between the ninth and tenth teeth 312 N times to form a coil 309b. Next, the winding 314 is drawn out from the slot 313 between the ninth and tenth teeth 312 and is wound around the riser 316 of the eleventh segment 315.

Subsequently, the winding 314 is inserted into the slot 313 between the twelfth and thirteenth teeth 312, and is wound between the slot 313 and the slot 313 between the fourteenth and fifteenth teeth 312 N times to form a coil 309c. Next, the winding 314 is drawn out from the slot 313 between the fourteenth and fifteenth teeth 312 and is wound around the riser 316 of the sixteenth segment 315.

Subsequently, the winding 314 is inserted into the slot 313 between the first and second teeth 312, and is wound between the slot 313 and the slot 313 between the third and fourth teeth 312 N times to form a coil 309d. Next, the winding 314 is drawn out from the slot 313 between the third and fourth teeth 312 and is wound around the riser 316 of the fifth segment 315.

Subsequently, the winding 314 is inserted into the slot 313 between the sixth and seventh teeth 312, and is wound between the slot 313 and the slot 313 between the eighth and ninth teeth 312 N times to form a coil 309e. Next, the winding 314 is drawn out from the slot 313 between the eighth and ninth teeth 312 and is wound around the riser 316 of the tenth segment 315.

Subsequently, the winding 314 is inserted into the slot 313 between the eleventh and twelfth teeth 312, and is wound between the slot 313 and the slot 313 between the thirteenth and fourteenth teeth 312 N times to form a coil 309f. Next, the winding 314 is drawn out from the slot 313 between the thirteenth and fourteenth teeth 312 and is wound around the riser 316 of the fifteenth segment 315.

Subsequently, the winding 314 is inserted into the slot 313 between the sixteenth and first teeth 312, and is wound between the slot 313 and the slot 313 between the second and third teeth 312 N times to form a coil 309g. Next, the winding 314 is drawn out from the slot 313 between the second and third teeth 312 and is wound around the riser 316 of the fourth segment 315.

Subsequently, the winding 314 is inserted into the slot 313 between the fifth and sixth teeth 312, and is wound between the slot 313 and the slot 313 between the seventh and eighth teeth 312 N times to form a coil 309h. Next, the winding 314 is drawn out from the slot 313 between the seventh and eighth teeth 312 and is wound around the riser 316 of the ninth segment 315.

Thus, the winding operation of the winding 314 using one flyer of the double flyer is completed. Thus, the armature coil 309 made up of eight coils 309a to 309h is formed. At the same time, the winding operation of the winding 314 using the other flyer of the double flyer is also completed. The armature coil 309 made up of eight coils 309a to 309h is formed when the other flyer is used as well.

Here, the winding end terminal 314b of the winding 314 wound by one flyer is connected to the same segment 315 as the winding start terminal 314a of the winding 314 wound by the other flyer.

(Operation of Electric Motor)

Next, a description will be given of a difference between a case in which a voltage is applied between the low-speed brush 321a and the common brush 321c, and a case in which a voltage is applied between the high-speed brush 321b and the common brush 321c.

When the voltage is applied between the high-speed brush 321b and the common brush 321c, since the high-speed brush 321b is present at a position advanced by an angle θ from the low-speed brush 321a (see FIG. 13), the number of the effective conductors to be energized is reduced as compared to a case in which a voltage is applied between the low-speed brush 321a and the common brush 321c. Therefore, when a voltage is applied between the high-speed brush 321b and the common brush 321c, the electric motor 302 is advanced and operates at high rotation, as compared to the case in which a voltage is applied between the low-speed brush 321a and the common brush 321c.

Therefore, according to the above-described third embodiment, in addition to the same effects as the above-described first embodiment, it is also possible to adopt a single wave winding in a structure which uses three brushes 321a to 321c capable of performing rotational speed switching of the electric motor 302.

Moreover, since the low-speed brush 321a and the common brush 321c among the three brushes 321a to 321c can be disposed opposite around the rotary shaft 303, it is possible to adopt a brush arrangement of a typical two-pole motor. Therefore, it is possible to increase the versatility of the electric motor 302, and as a result, it is possible to reduce the manufacturing cost.

(First Modified Example of Third Embodiment)

Further, in the above-described third embodiment, the case in which, when the winding 314 is wound around the armature core 308, an interval between a predetermined segment 315 and a predetermined slot 313 is wired by the shortest distance has been described. However, the third embodiment of the present invention is not limited thereto, and the winding 314 between a predetermined segment 315 and a predetermined slot 313 may be wired while being wound around the rotary shaft 303. This will be specifically described with reference to FIG. 16 below.

Figure 16:
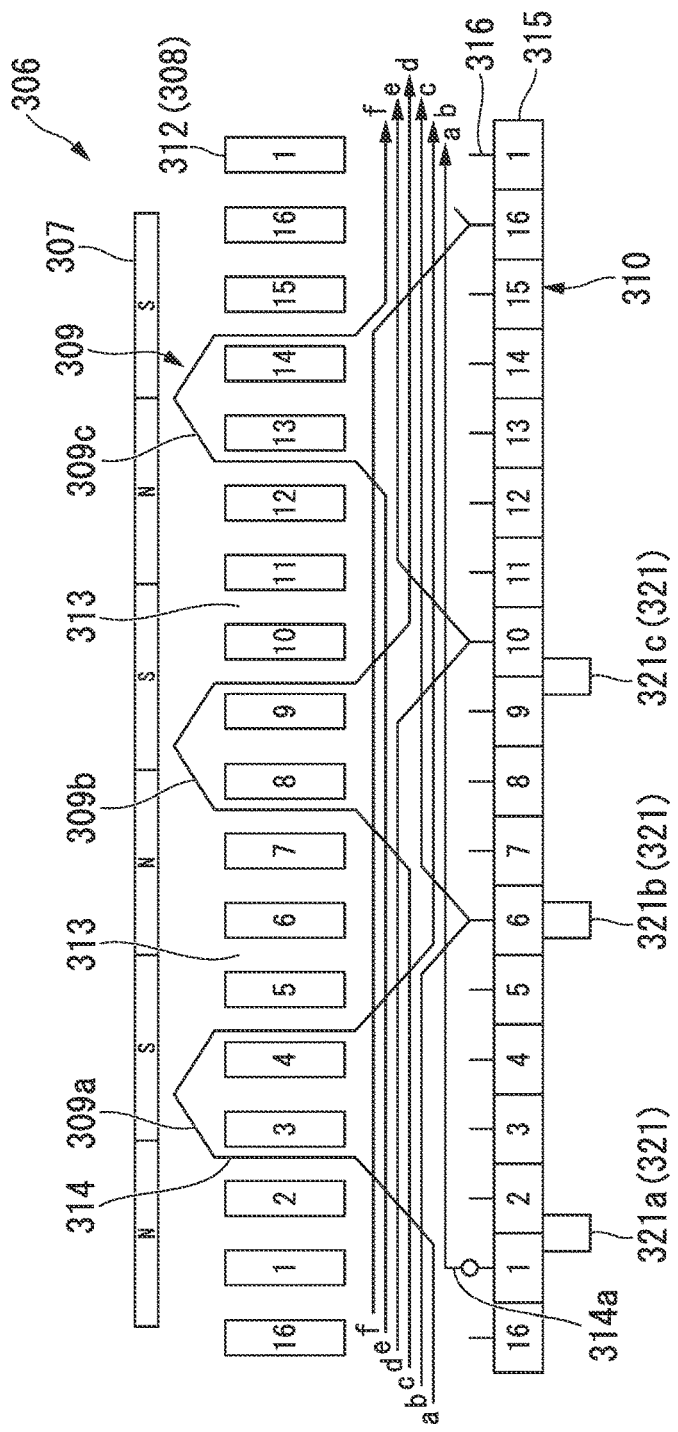
FIG. 16 is an exploded view of an armature according to a first modified example of the third embodiment of the present invention.

FIG. 16 is an exploded view of an armature 306 and corresponds to FIG. 14 of the third embodiment. Further, the same aspects as the third embodiment are denoted by the same reference numerals and description thereof will not be provided.

As illustrated in the FIG. 16, the winding 314 in which the winding start terminal 314a is wound around a riser 316 of the first segment 315 is wound around the rotary shaft 303 without being directly inserted into the slot 313 between the second and third teeth 312, and then the winding 314 is inserted into the slot 313 between the second and third teeth 312. Further, the winding 314 is wound between the slot 313 and the slot 313 between the fourth and fifth teeth 312 N times to form a coil 309a.

Next, the winding 314 drawn out from the slot 313 between the fourth and fifth teeth 312 is wound around the rotary shaft 303 again without being directly wound around the riser 316 of the sixth segment 315, and then the winding 314 is wound around the riser 316 of the sixth segment 315.

Subsequently, after the winding 314 is wound around the rotary shaft 303 again, the winding 314 is inserted into the slot 313 between the seventh and eighth teeth 312, and is wound between the slot 313 and the slot 313 between the ninth and tenth teeth 312 N times to form a coil 309b.

Next, after the winding 314 is drawn out from the slot 313 between the ninth and tenth teeth 312 and is wound around the rotary shaft 303, the winding 314 is wound around the riser 316 of the tenth segment 315.

Furthermore, after the winding 314 is wound around the rotary shaft 303 again, the winding 314 is inserted into the slot 313 between the twelfth and thirteenth teeth 312, and is wound between the slot 313 and the slot 313 between the fourteenth and fifteenth teeth 312 N times to form a coil 309c. Further, the winding 314 is wound around the rotary shaft 303 again, and then the winding 314 is wound around the riser 316 of the sixteenth segment 315.

In this way, the winding 314 is sequentially wound between the predetermined slots 313 and around the riser 316 of a predetermined segment 315, while the winding 314 wired between the armature core 308 and the segment 315 being entirely wound around the rotary shaft 303, thereby forming an armature coil 309 made up of eight coils 309a to 309h.

Therefore, according to the above-described modified example, in addition to the same effects as in the above-described third embodiment, it is possible to suppress the thick winding of the winding 314 between the armature core 308 and the segment 315. Thus, the size of the armature 306 can be reduced.

(Second Modified Example of Third Embodiment)

In the above-described third embodiment, the case adopting a structure with three brushes 321a to 321c disposed on a so-called 6-pole 16-slot 16-segment electric motor 302 in which the six permanent magnets 307 (the number of magnetic poles is six), the sixteen slots 313 and the sixteen segments 315 are set has been described. However, the structure in which the three brushes 321a to 321c are disposed can also be adopted in the 6-pole 14-slot 14-segment electric motor (e.g., the electric motor unit 201 of the second embodiment).

Figure 17:
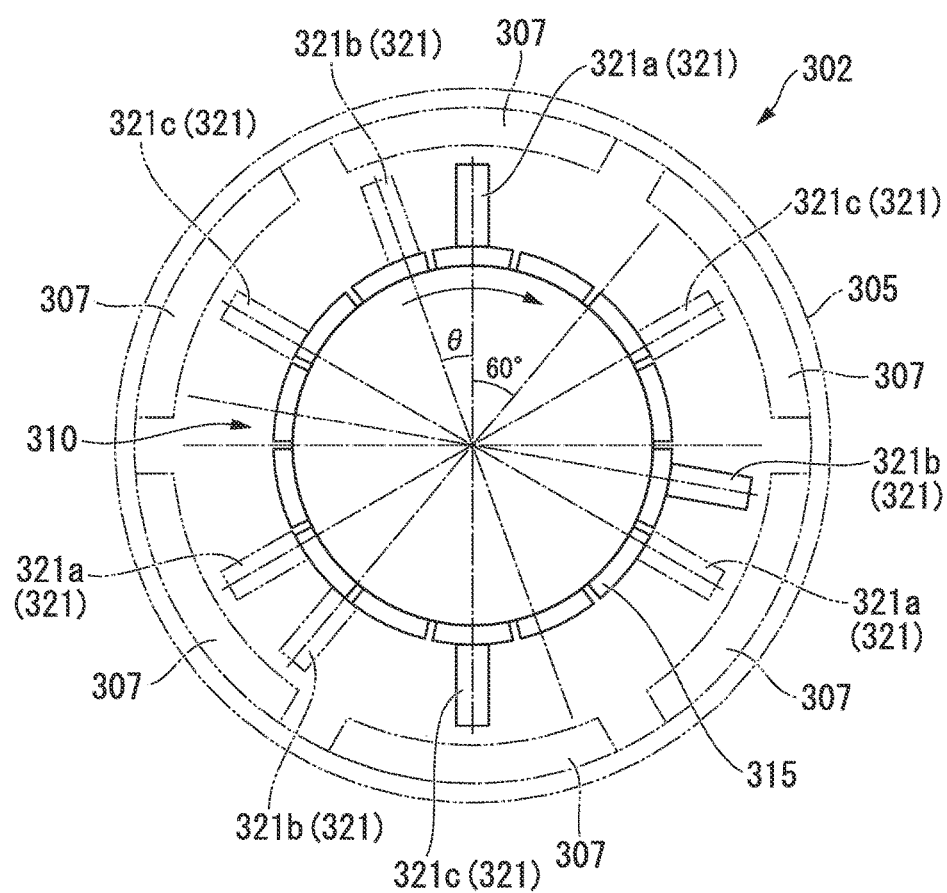
FIG. 17 is an explanatory view illustrating an arrangement of a brush according to a second modified example of the third embodiment of the present invention.

FIG. 17 is an explanatory view illustrating the arrangement of the brush 321 in the second modified example of the third embodiment and corresponds to FIG. 13.

As illustrated in FIG. 17, even in an electric motor 302 equipped with the commutator 310 having fourteen segments 315 and six permanent magnets 307, the low-speed brush 321a and the common brush 321c can be disposed opposite around the rotary shaft 303.

Further, the low-speed brush 321a may be disposed at any location, as long as it is located at a position of a mechanical angle interval of 120°. That is, in FIG. 17, it is also possible to dispose the low-speed brush 321a at a position apart from the common brush 321c by a mechanical angle of 60° (see a two-dot chain line in FIG. 17).

Further, the common brush 321c may also be disposed at any location, as long as it is located at a position of a mechanical angle interval of 120°. That is, in FIG. 17, it is also possible to dispose the common brush 321c at a position apart from the low-speed brush 321a by a mechanical angle of 60° (see a two-dot chain line in FIG. 17).

Meanwhile, the high-speed brush 321b is disposed apart from the position at which the low-speed brush 321a can be disposed by an angle θ in the circumferential direction. That is, the high-speed brush 321b is disposed at a position advanced by the angle θ from the low-speed brush 321a.

The high-speed brush 321b may also be disposed at any location, as long as it is located at a position of a mechanical angle interval of 120°. That is, it is possible to dispose each high-speed brush 321b at a position which is circumferentially advanced by an angle θ from the position at which the low-speed brush 321a can be disposed (see the two-dot chain line in FIG. 17).

(Fourth Embodiment) (Electric Motor Device)

Next, a fourth embodiment of the present invention will be described on the basis of FIGS. 18 to 23.

Figure 18:
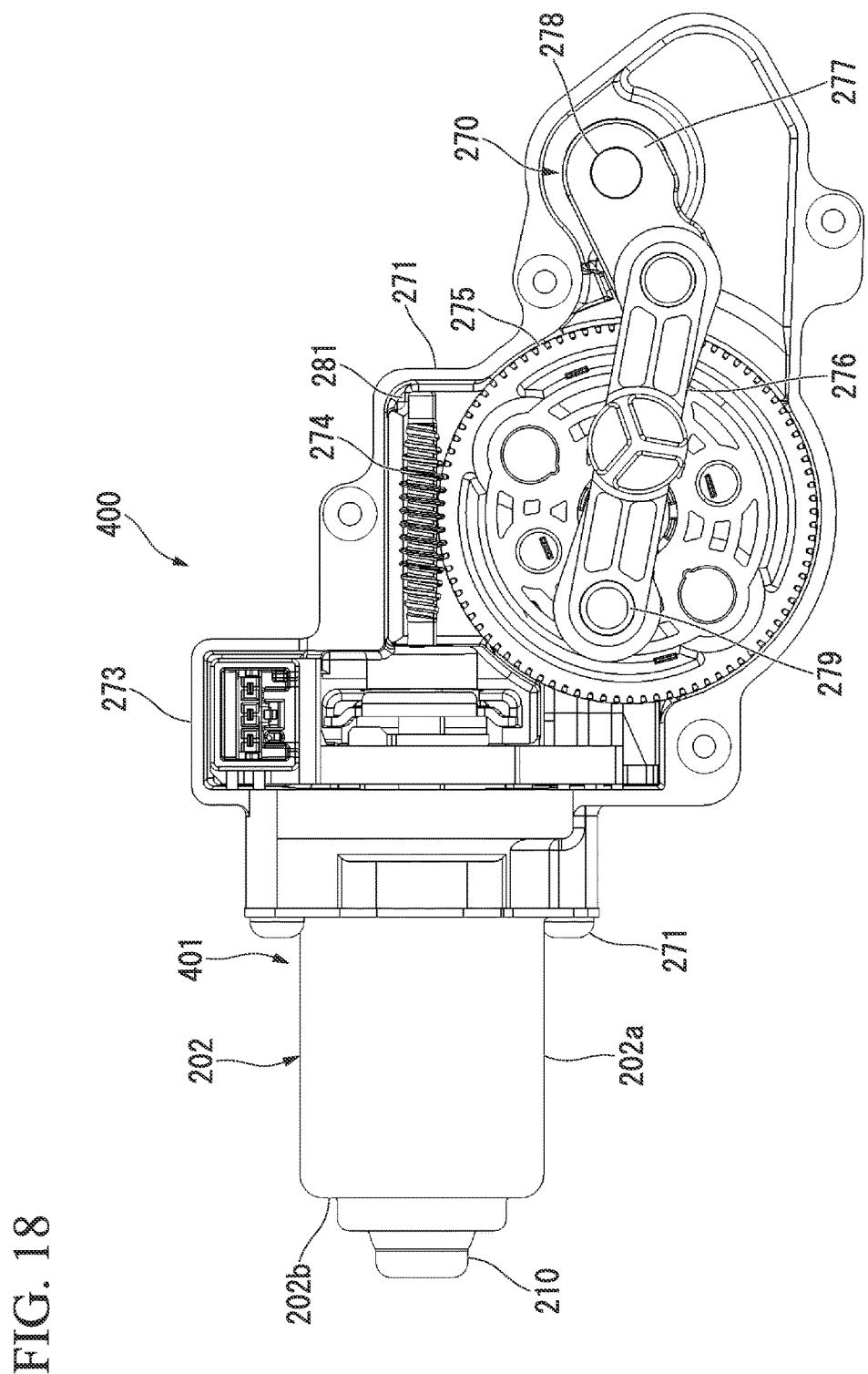
FIG. 18 is a plan view illustrating a configuration of an electric motor device according to a fourth embodiment of the present invention.
Figure 19:
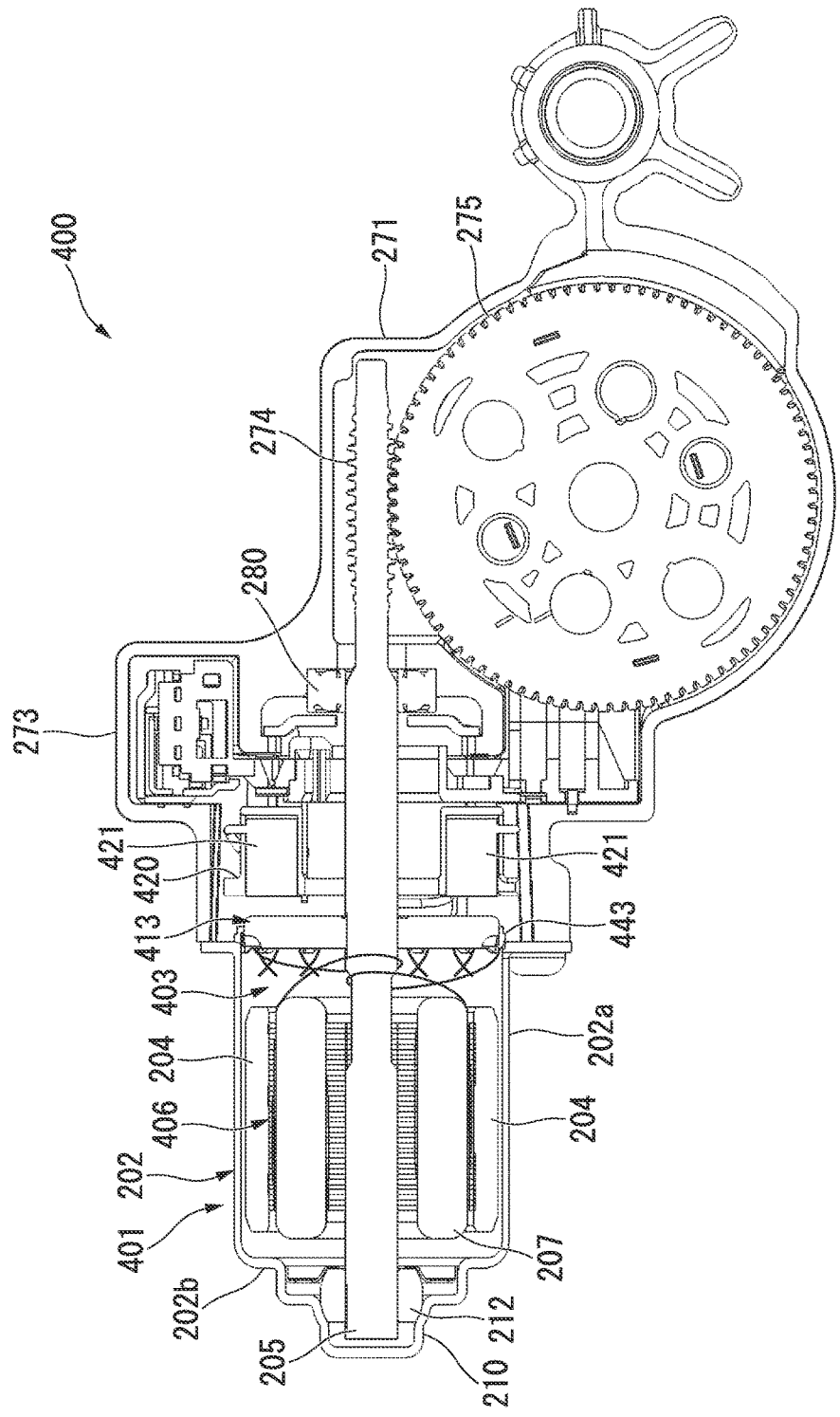
FIG. 19 is a cross-sectional view illustrating the configuration of the electric motor device according to the fourth embodiment of the present invention.

FIG. 18 is a plan view illustrating the configuration of an electric motor device 400. FIG. 19 is a cross-sectional view illustrating the configuration of the electric motor device 400.

Here, the fourth embodiment is different from the second embodiment in that a commutator 413 in the electric motor unit 401 of the fourth embodiment is different from the commutator 213 in the electric motor unit 201 of the second embodiment. Therefore, in the following description, only the differences from the second embodiment will be described, and the same aspects as the second embodiment of the aforementioned are denoted by the same reference numerals, and description thereof will not be provided.

(Armature) (Commutator)

Figure 20:
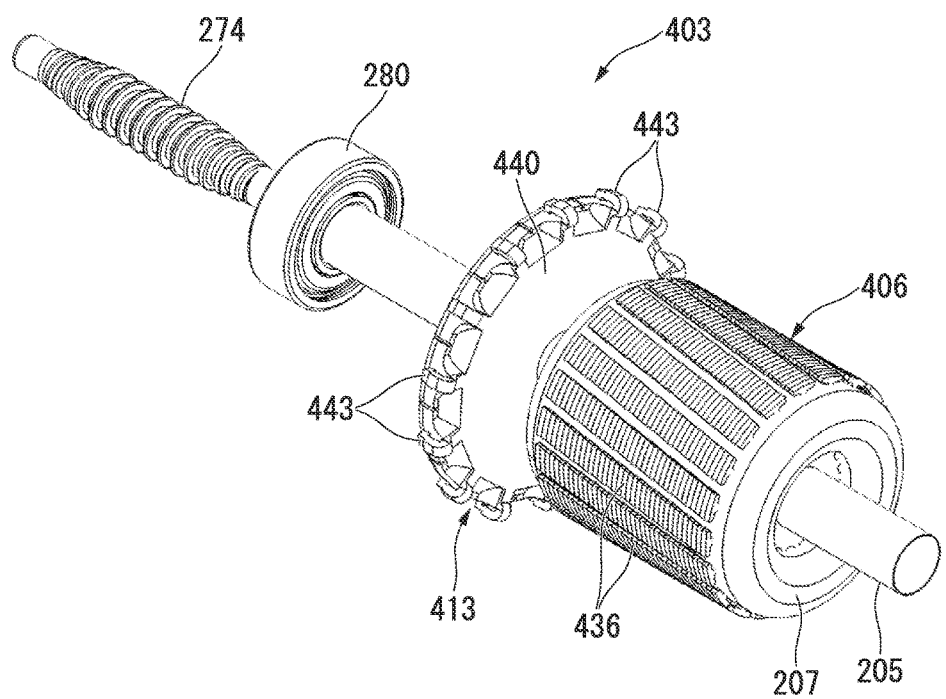
FIG. 20 is a perspective view in which the armature according to the fourth embodiment of the present invention is viewed from the armature core side.
Figure 21:
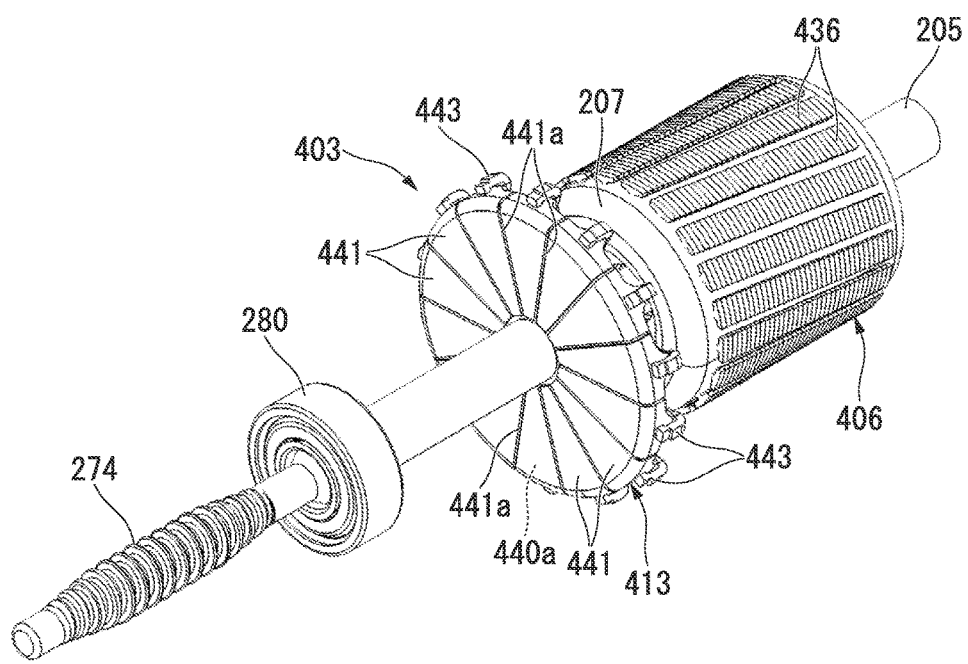
FIG. 21 is a perspective view in which an armature according to a fourth embodiment of the present invention is viewed from a worm shaft side.

FIG. 20 is a perspective view in which the armature 403 of the fourth embodiment is viewed from the armature core 406 side. FIG. 21 is a perspective view in which the armature 403 of the fourth embodiment is viewed from the worm shaft 274 side.

As illustrated in FIGS. 20 and 21, a commutator 413 which constitutes the armature 403 is a so-called disc type commutator which is formed in a disc shape. The commutator 413 includes a resin mold body 440 which is externally fitted and fixed to the rotary shaft 205 and is formed in approximately a disc shape, and a plurality of (e.g., fourteen in the fourth embodiment) segments 441 which are disposed to be exposed through one surface 440a of the resin mold body 440 on the opposite side to the armature core 406.

The segments 441 are disposed radially around the rotary shaft 205 in the circumferential direction. Also, each segment 441 is formed in substantially a fan shape when viewed in the axial direction to widen from the radial inner side to the radial outer side.

Also, slits 441a for ensuring the insulation between the segments 441 are formed between the segments 441. Further, a riser 443 which is bent in the form of being folded to the worm shaft 274 side is integrally formed on the radial outer end of each segment 441. The winding 238 (see FIG. 6) is wound around the riser 443, for example, in the a winding method.

In the commutator 413 having such a configuration, the segment 441 side faces the holder stay 420. The holder stay 420 is disposed inside the gear case 271 (see FIG. 19).

Further, in FIGS. 20 and 21, the teeth 436 of the armature core 406 are skewed to be twisted in the axial direction. However, as illustrated in the second embodiment (FIG. 6), the teeth 436 may not be skewed.

(Holder Stay)

Figure 22:
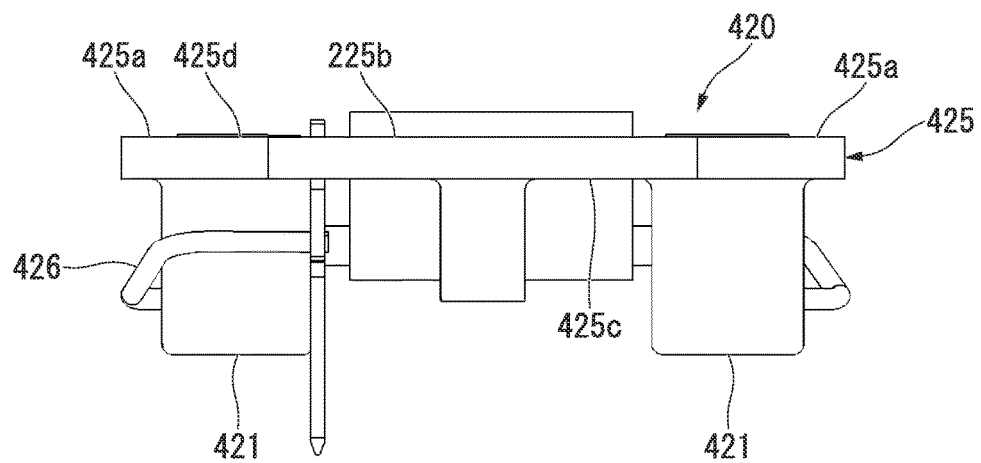
FIG. 22 is a side view of a holder stay according to the fourth embodiment of the present invention.
Figure 23:
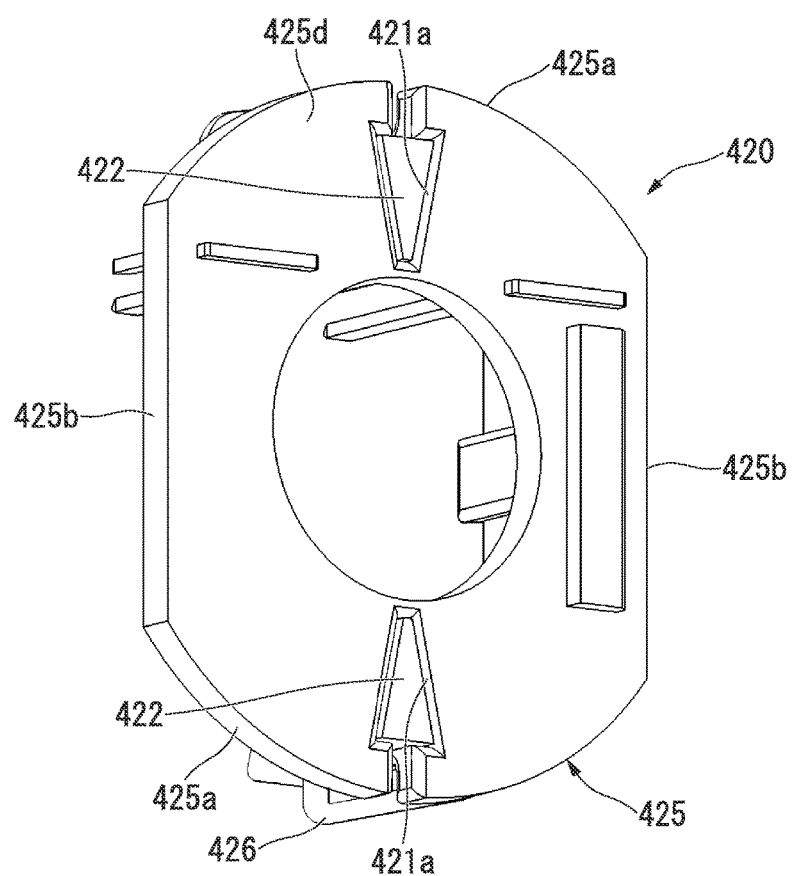
FIG. 23 is a perspective view in which the holder stay according to the fourth embodiment of the present invention is viewed from a transmission mechanism side.

FIG. 22 is a side view of the holder stay 420. FIG. 23 is a perspective view in which the holder stay 420 is viewed from the transmission mechanism 270 side.

As illustrated in FIGS. 22 and 23, the holder stay 420 is made of a resin, and has a stay main body 425 in which a plan view seen from the axial direction is formed in a substantially elliptical shape. That is, the circumference of the stay main body 425 includes a pair of circular arc sides 425a disposed at both longer ends, and a pair of flat sides 425b which are disposed at both shorter ends to connect the pair of circular arc sides 425a.

On one surface 425c of the stay main body 425 on the opposite side to the commutator 413, on the radial inner side of the pair of circular arc sides 425a, and at a position corresponding to the circumferential center of each circular arc side 425a, a pair of brush holders 421 standing in the axial direction is integrally molded. The brush holders 421 are formed in box shapes to have opening portions 421a on the other surface 425d of the stay main body 425 on the side facing the commutator 413. The brushes 422 are built in the brush holders 421 to freely move back and forth with respect to the commutator 413 while biased via a coil spring (not illustrated).

The brush 422 is formed to have a substantially fan-shaped cross section to correspond to the shape of the segment 441. Since the tip portions of each brush 422 are biased by a coil spring (not illustrated), the brush is in slide contact with the segment 441. The brush 422 is electrically connected to a terminal 427 via a pigtail 426. The terminal 427 is inserted into the connector unit 273 of the gear case 271. In such a configuration, when a connector extending from an external power source (not illustrated) is fitted to the connector unit 273, the voltage of the external power source is applied to the armature coil 207 via the terminal 427, the pigtail 426, the brush 422 and the segment 441.

Further, in the above-described second embodiment, although the holder stay 220 has been described simply, component shapes of each part are different from those of the fourth embodiment, but the basic component configuration of the holder stay 220 of the second embodiment is the same as that of the fourth embodiment.

Therefore, according to the above-described fourth embodiment, it is possible to achieve the same effect as the above-described second embodiment. Moreover, in the commutator 213 of the second embodiment, the resin mold body 240 is formed in a substantially columnar shape. Meanwhile, in the commutator 413 of the fourth embodiment, the resin mold body 440 is formed in substantially a disc shape. That is, the commutator 413 of the fourth embodiment is flattened as compared to the commutator 213 of the second embodiment. Therefore, as compared to the second embodiment, the axial sizes of the circumferential brush 422 and the brush holder 421 can be reduced.

(Fifth Embodiment) (Motor with Speed Reduction Gear)

Next, a fifth embodiment of the present invention will be described on the basis of FIGS. 24, 25A, 25B, 26 and 27.

Figure 24:
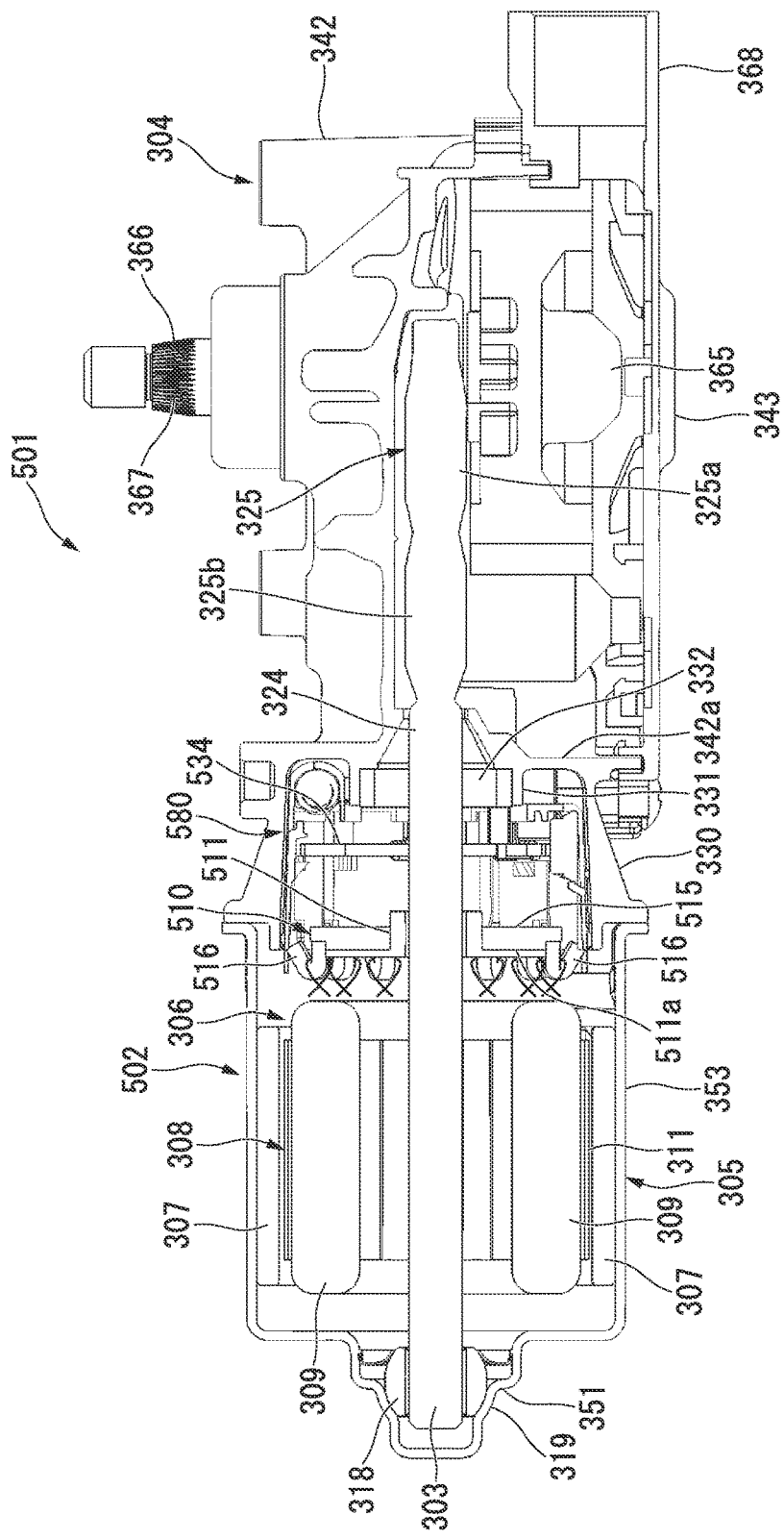
FIG. 24 is a longitudinal cross-sectional view of a motor with a speed reduction gear according to a fifth embodiment of the present invention.

FIG. 24 is a longitudinal cross-sectional view of a motor with a speed reduction gear 501 and corresponds to FIG. 11.

Here, the fifth embodiment is different from the third embodiment in that a shape of a commutator 510 in an electric motor 502 of the fifth embodiment is different from the commutator 310 in the electric motor 302 of the third embodiment. Therefore, in the following description, only the difference in shape from the third embodiment will be described, and the same aspects as the third embodiment are denoted by the same reference numerals and description thereof will not be provided.

(Commutator)

The commutator 510 of the fifth embodiment is a so-called disc type commutator which is formed in a disc shape.

Here, the commutator 510 is the same as that of the fourth embodiment in the following points.

That is, the commutator 510 is the same as that of the fourth embodiment in that the commutator 510 includes a resin mold body 511 which is externally fitted and fixed to the rotary shaft 303 and is formed in substantially a disc shape, and a plurality of (e.g., sixteen in the fifth embodiment) segments 515 which are disposed while exposed through one side 511a of the resin mold body 511 on the opposite side to the armature core 406. For this reason, a detailed description of the commutator 510 will not be provided.

Further, the winding 314 (see FIG. 14) is also wound around a riser 516 of the commutator 510 in the fifth embodiment, for example, in the a winding method.

Further, a holder stay 534 is provided inside the brush housing portion 322 which is formed integrally with the gear housing 323 of the speed reduction mechanism 304. This holder stay 534 and the brush holder 583 constitute a brush holder unit 580.

(Brush Holder Unit)

Figure 25A:
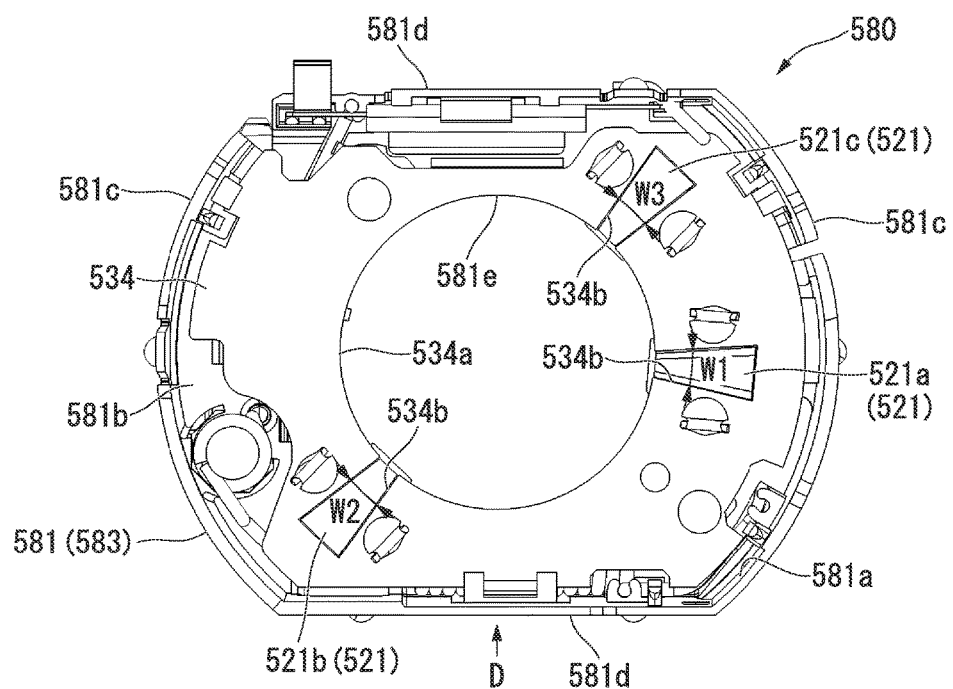
FIG. 25A is a plan view in which the brush holder unit according to the fifth embodiment of the present invention is viewed from the commutator side.
Figure 25B:
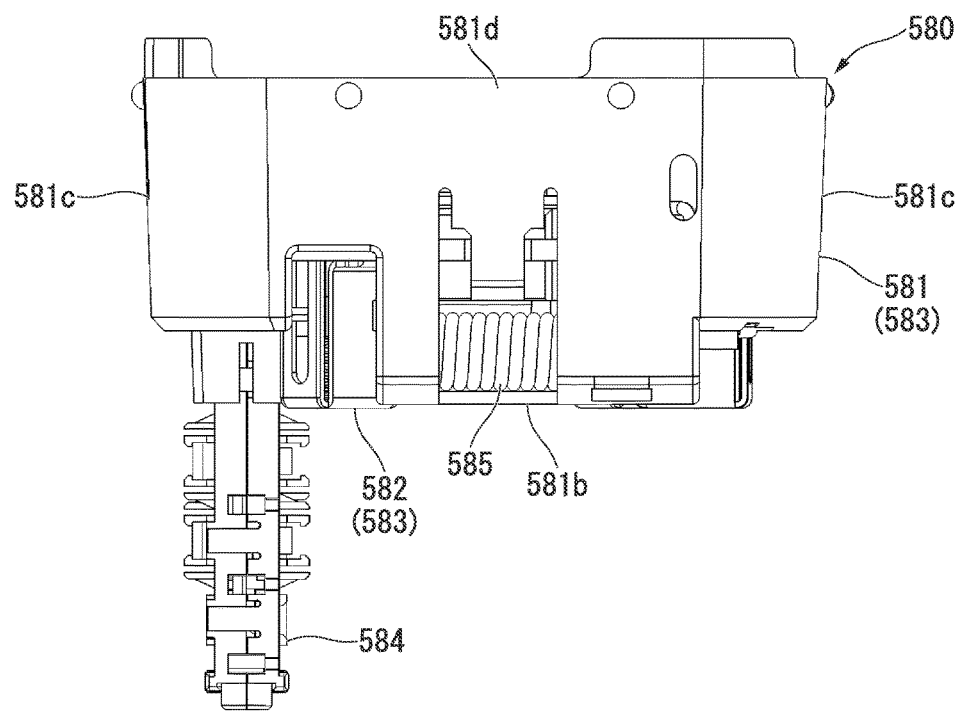
FIG. 25B is a diagram taken along an arrow D of FIG. 25A which illustrates the brush holder unit according to the fifth embodiment of the present invention.
Figure 26:
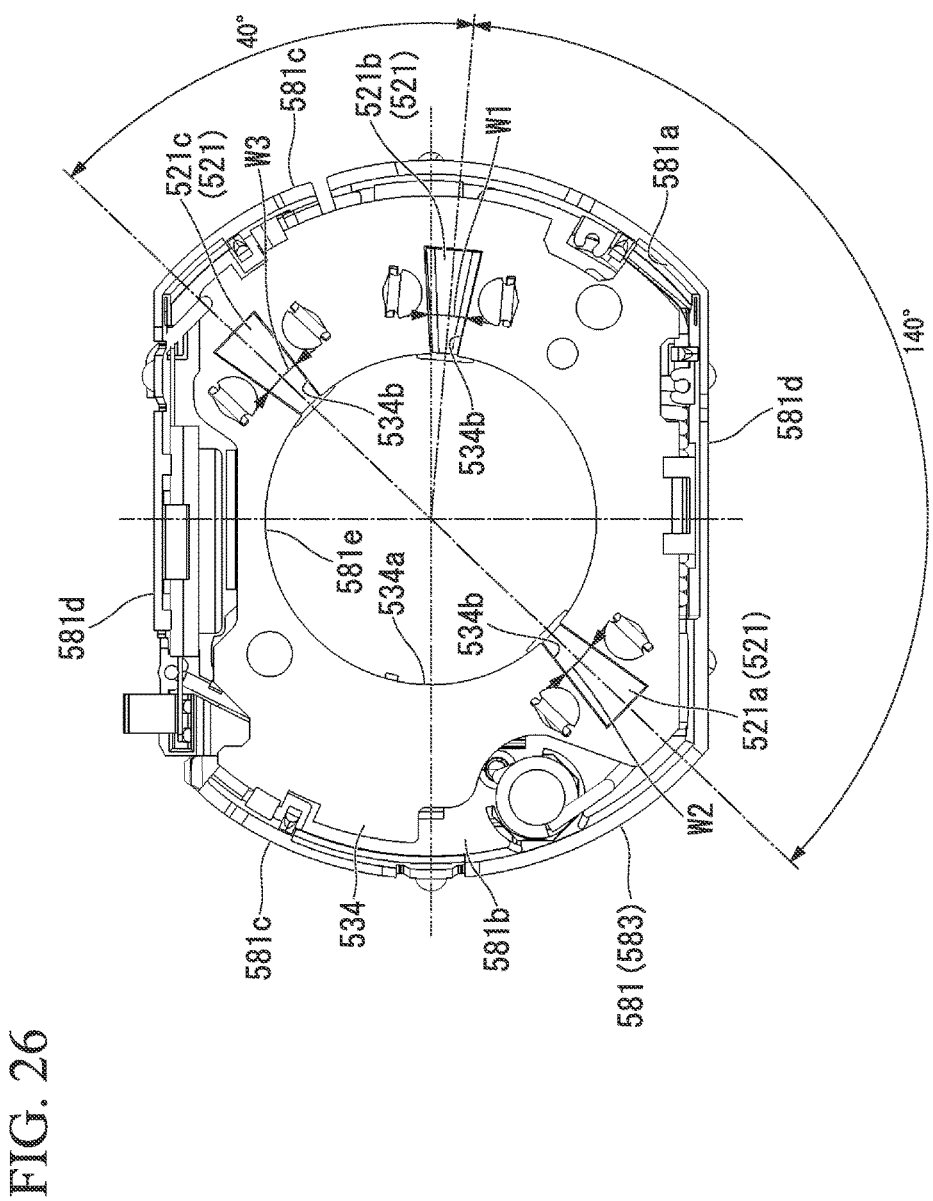
FIG. 26 is a diagram illustrating an arrangement configuration of a brush according to a modified example of the fifth embodiment of the present invention.

FIG. 25A is a plan view in which the brush holder unit 580 is viewed from the commutator 510 side. FIG. 25B is a diagram taken from an arrow D of FIG. 25A.

As illustrated in FIGS. 24, 25A and 25B, the brush holder 583 includes a box-shaped holder cover 581 having an opening portion 581a on the side facing the commutator 510, and a holder main body 582 which is erected on the holder stay 534.

A bottom surface 581b of the holder cover 581 is formed in a substantially elliptical shape in a plan view. Therefore, side walls erected from the circumference of the bottom surface 581b include a pair of circular arc walls 581c arranged at both longer ends of the bottom surface 581b, and a pair of flat walls 581d which are disposed at both shorter ends of the bottom surface 581b to connect the pair of circular arc walls 581c. An opening portion 581e through which the rotary shaft 303 is inserted is formed on the bottom surface 581b of the holder cover 581.

The holder stay 534 is housed inside the holder cover 581 having such a configuration. The holder stay 534 is formed in an elliptical shape so that the plate-like member corresponds to the shape of the bottom surface 581b of the holder cover 581. An opening portion 534a through which the rotary shaft 303 is inserted is formed on the holder stay 534, coaxially with the opening portion 581e formed on the holder cover 581. Also, on the side of the holder stay 534 facing the bottom surface 581b of the holder cover 581, the holder main bodies 582 are provided at three locations.

The holder main bodies 582 are formed in a rectangular box shape, for example, of brass. The holder main bodies 582 are provided so that the holder stay 534 side is open. An opening portion 534b is formed on the holder stay 534 at a position corresponding to the holder main body 582. The brushes 521 are housed in the holder main bodies 582. The tip of the brush 521 is exposed by the opening portion 534b of the holder stay 534. Moreover, each brush 521 is adapted to freely move back and forth toward the commutator 510 side via the opening portion 534b of the holder stay 534. Moreover, each brush 521 is biased toward the commutator 510 side via a coil spring (not illustrated), and its tip is always in slide contact with the segment 515.

Moreover, each brush 521 is electrically connected to a terminal 584 provided on the holder cover 581 via a pigtail (not illustrated). The terminal 584 is connected to the connector 368 of the housing main body 342 via the substrate 371. In addition to this, a choke coil 585 is provided inside the holder cover 581. The choke coil 585 is a noise prevention element for reducing the electrical noise.

In this configuration, when the connector extending from an external power source (not illustrated) is fitted to the connector 368, the voltage of the external power source is applied to the armature coil 309 (see FIG. 14) via the terminal 584, the brush 521, the segments 515 or the like.

Like the above-described fourth embodiment, the shape of the brush 521 is formed to have a substantially fan-shaped cross-section. In addition, like the above-described third embodiment, the brush 521 is configured to include a low-speed brush 521a and a high-speed brush 521b connected to the anode side, and a common brush 521c which is commonly used with the low-speed brush 521a and the high-speed brush 521b and is connected to the cathode side. Since the positional relationships of the brushes 521 (521a, 521b and 521c) are the same as in the above-described third embodiment, the description thereof will not be provided.

A circumferential width W2 of the high-speed brush 521b is set to be slightly smaller than a circumferential width W1 of the low-speed brush 521a and a circumferential width W3 of the common brush 521c. This is for the following reason.

That is, each of the brushes 521a, 521b and 521c always comes into slide contact with the segment 515. Therefore, even when the high-speed brush 521b is not used, when the high-speed brush 521b is located between the adjacent segments 515 in the circumferential direction, the armature coils 309 connected between the segments 515 are short-circuited by the high-speed brush 521b (see FIG. 14). In this case, since the short-circuit current flows through the short-circuited armature coil 309, loss of motor power occurs in the electric motor 502. To reduce the loss, the circumferential width W2 of the high-speed brush 521b is set to be slightly smaller than the circumferential width W1 of the low-speed brush 521a and the circumferential width W3 of the common brush 521c.

Although the brush holder unit is not described in the above-described third embodiment, the product shapes of each part are different from those of the fifth embodiment, but the brush holder unit having the same basic component configuration as the brush holder unit 580 of the fifth embodiment is also provided in the third embodiment.

Therefore, according to the fifth embodiment, it is possible to achieve the same effect as the third embodiment. Moreover, the commutator 310 of the third embodiment is formed in a substantially columnar shape, while the commutator 510 of the fifth embodiment is formed in a disc shape. That is, the commutator 510 of the fifth embodiment is flattened as compared to the commutator 310 of the third embodiment. Therefore, as compared to the third embodiment, it is possible to reduce the peripheral axial size (size of the brush holder unit 580) of the circumferential brush 521 and the brush holder 583.

In this embodiment, each brush 521 (521a, 521b and 521c) is explained to be similar to that of the above-described third embodiment. However, as a modified example of this embodiment, the brushes 521 (521a, 521b and 521c) may have the positional relationships illustrated in FIG. 26. That is, the low-speed brush 521a and the common brush 521c are disposed at positions facing each other at a mechanical angle of 180°. The high-speed brush 521b is positioned to be advanced to the position of 40° from the common brush 521c. This is for the following reason.

Figure 27:
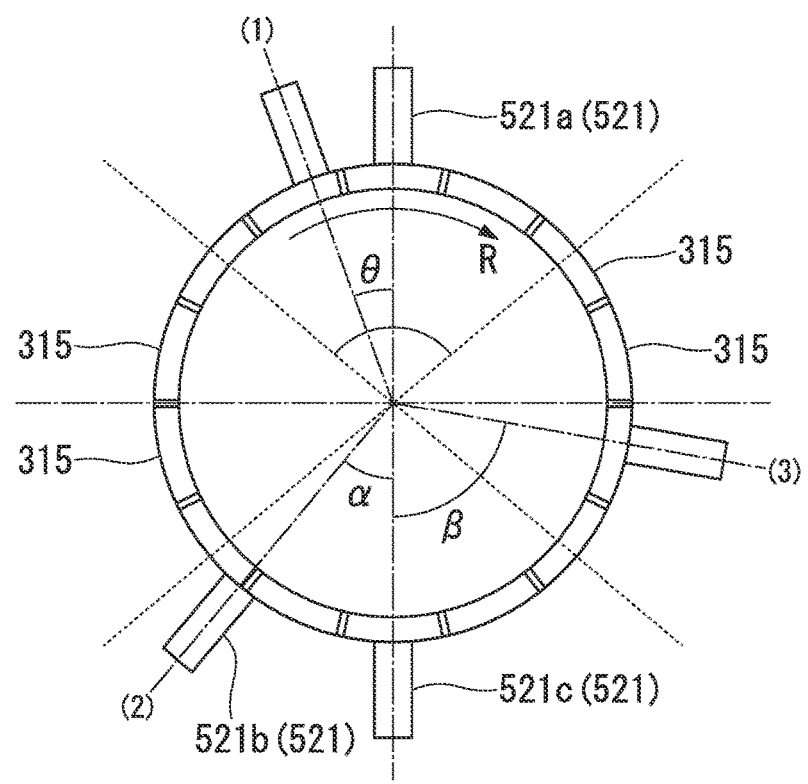
FIG. 27 is a diagram illustrating the concept of the arrangement of the brush according to the modified example of the fifth embodiment of the present invention.

The concept of the arrangement of the brush according to this modified example is illustrated in FIG. 27. As illustrated in FIG. 27, the low-speed brush 521a and the common brush 521c are preferably disposed to face each other at a mechanical angle of 180° in view of the whirling. Then, three positions (1) to (3) illustrated in FIG. 27 become a candidate for the position at which the high-speed brush 521b is disposed. Since the electrical angle of the high-speed brush advanced angle is generally 30°, when θ in FIG. 27 is assumed to be 20°.

It is possible to dispose the high-speed brush 521b at the position (1) of the mechanical angle of 20° from the low-speed brush 521a. However, since the position of (1) is too close to the low-speed brush 521a, it is necessary to devise the layout.

It is possible to dispose the high-speed brush 521b at the position (2) of α° (40°) from the common brush 521c.

It is possible to dispose the high-speed brush 521b at the position (3) of β° (80°) from the common brush 521c.

Here, since the position from the common brush 521c becomes farthest at (3), a degree of freedom of the layout of the brush is low. That is, the movable amount in the brush arrangement range becomes smaller. Therefore, in the 6-pole 3-brush structure, when the low-speed brush 521a and the common brush 521c are disposed to face each other at 180°, it is preferable from the height of the degree of freedom of the layout that the arrangement position of the high-speed brush 521b be disposed at the nearest location in the same direction as the rotational direction of the armature as viewed from the common brush 521c, that is, at the position of (2) in FIG. 27.

(Sixth Embodiment) (Armature Core)

A sixth embodiment of the present invention will be described on the basis of FIGS. 28 and 29.

Figure 28:
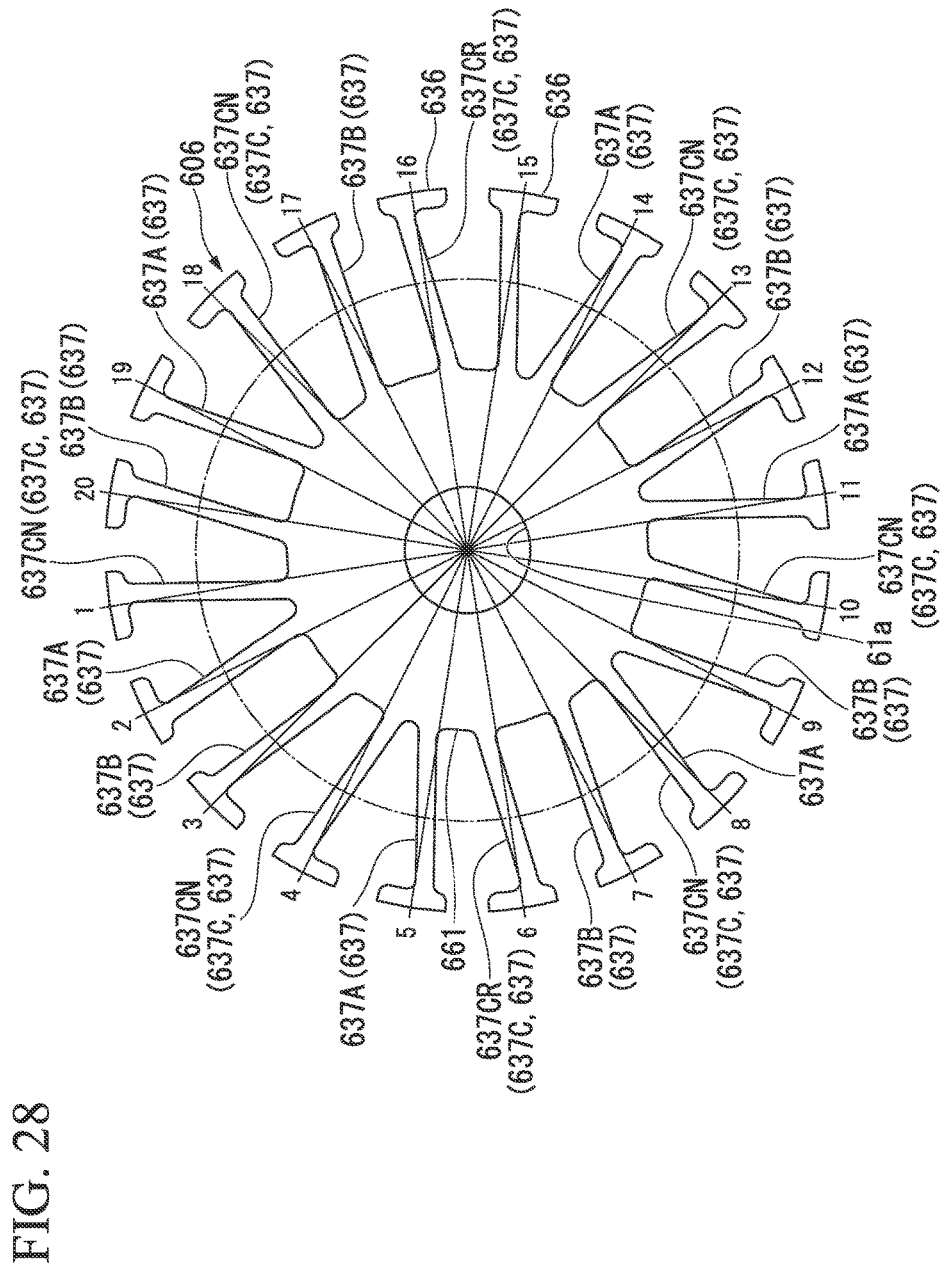
FIG. 28 is a diagram illustrating an armature core according to a sixth embodiment of the present invention.

FIG. 28 is a diagram illustrating an armature core according to the sixth embodiment of the present invention. FIG. 29 is an explanatory view in which a winding state of the armature coil on the armature core according to the sixth embodiment of the present invention is viewed in the axial direction.

The armature core 606 illustrated in FIG. 28 is a 20-slot 20-segment armature core, similarly to the first embodiment of the present invention. The armature core 606 according to this embodiment is different from the armature core 6 according to the first embodiment in the arrangement of the teeth and the shape of the slot.

In the following description, the elements common with the first embodiment are denoted by the same reference numerals, and description thereof will not be provided.

An armature core 606 illustrated in FIG. 28 is formed by axially stacking a plurality of metal pieces, or by pressure-molding a soft magnetic powder. The armature core 606 has a substantially annular rotary shaft fixing section 661 which is externally fitted and fixed to the rotary shaft 5. A rotary shaft 5 is press-fitted to the insertion hole 61a formed in the rotary shaft fixing section 661.

On the radial outer side of the rotary shaft fixing section 661, twenty teeth 636 are radially formed in the circumferential direction. Dovetail-shaped slots 637 are formed between the adjacent teeth 636. The slots 637 extend in the axial direction, and twenty slots are formed in the circumferential direction. Here, as illustrated in FIG. 28, in the armature core 606 of this embodiment, the intervals of the teeth 636 are not equal in the circumferential direction. Further, the intervals and shapes of the slots 637 are not uniform in the circumferential direction.

That is, the slots 637 included in the armature core 606 of this embodiment include a tip wide slot 637A in which the radial outer side of the armature core 606 has a wide shape, a bottom wide slot 637B in which a bottom has a wide shape, and an intermediate width slot 637C having an intermediate shape between the tip wide slot 637A and the bottom wide slot 637B.

In the tip wide slot 637A, the interval between the adjacent teeth 636 is wider toward the radial outer side. Thus, the tip wide slot 637A has a shape in which the width is narrower on the bottom side of the teeth 636, and the interval is wide on the radial outer side.

Meanwhile, in the bottom wide slot 637B, the position at which the adjacent teeth 636 are provided at the rotary shaft fixing section 661 has a circumferential interval. That is, the teeth 636 which constitute the bottom wide slot 637B are provided on the rotary shaft fixing section 661 to have a circumferential interval. The teeth 636, which are provided on the rotary shaft fixing section 661 to have a circumferential interval, radially and linearly extend radially outward. Thus, the bottom wide slot 637B has a shape in which the interval becomes wider on the bottom side of the teeth 636.

In the intermediate width slot 637C, the radial outer interval of the adjacent teeth 636 is narrower than the tip wide slot 637A, and is wider than the bottom wide slot 637B. The interval of the position at which the adjacent teeth 636 are provided on the rotary shaft fixing section 661 is wider than the tip wide slots 637A, and is narrower than the bottom wide slot 637B. By this shape, the intermediate width slot 637C can secure a wide space at a radially intermediate position of the teeth 636.

The teeth 636 of this embodiment are different from the teeth 36 according to the first embodiment in the shape of the axial plan view. That is, the teeth 36 according to the first embodiment are substantially T-shaped in an axial plan view. Meanwhile, as illustrated in FIG. 28, the teeth 636 according to the present embodiment have asymmetrical shapes in which one of the tips is long and the other is short. That is, the tips of the teeth 636 according to this embodiment have a long side portion and a short side portion.

In the armature core 606, in principle, the teeth 636 have shapes in which the long side of the tip is disposed in a winding direction of the winding 38 while the teeth 636 are configured in shapes in which the tip is reversed in the teeth 636 on the side in which the winding order of the winding 38 becomes a succeeding order in the tip wide slot 637A.

Further, the intermediate width slot 637C is divided into two shapes of a forward intermediate width slot 637CN and a reverse intermediate width slot 637CR, by the arrangement configuration of the long side portion and the short side portion of the tip of the teeth 636. In the forward intermediate width slot 637CN, both the long side portions of the tips of the adjacent teeth 636 which form the forward intermediate width slot 637CN are arranged in the winding direction of the winding 38. Meanwhile, in the reverse intermediate width slot 637CR, the tips of the adjacent teeth 636 which form the reverse intermediate width slot 637CR are reversed, and the long side portion is disposed in a direction opposite to in the winding direction of the winding 38.

Specifically, in the armature core 606 illustrated in FIG. 28, when the teeth 636 are denoted by the numbers 1 to 20 to correspond to the segment 41, the slot 637 formed between the first tooth 636 and the second tooth 636 becomes a tip wide slot 637A. Moreover, the long side portion of the tip of the first tooth 636 is disposed on the second tooth 636 side which is the winding direction of the winding 38. Meanwhile, the second tooth 636 is formed in a shape in which the tip portion is reversed at a point at which a virtual circle illustrated by a dashed line in FIG. 28 intersects a virtual center line extending toward the second tooth 636 from the center of the armature core 606, and the long side portion faces the first tooth 636.

A bottom portion of the third tooth 636 which is in contact with the rotary shaft fixing section 661 is provided at a circumferential interval from the second tooth 636. Further, the third tooth 636 extends substantially linearly and radially toward the radial outer side of the armature core 606. Thus, a bottom wide slot 637B having a wide interval at the bottom is formed between the second tooth 636 and the third tooth 636.

The slot 637 formed between the second tooth 636 and the third tooth 636 is a bottom wide slot 637B having a wide interval at the bottom. Therefore, the tip of the third tooth 636 in which the winding order of the winding 38 becomes a succeeding order is not reversed. That is, the long side portion of the tip of the third tooth 636 has a shape that is disposed toward the fourth tooth which is the winding direction of the winding 38.

A bottom portion of the fourth tooth 636 which is in contact with the rotary shaft fixing section 661 is provided at a circumferential interval from the third tooth 636. However, the interval between the bottom portion of the third tooth 636 and the bottom portion the fourth tooth 636 is narrower than a circumferential interval between the bottom portion of the second tooth 636 and the bottom portion of the third tooth 636. The tip of the fourth tooth 636 extends away from the third tooth 636 as it goes radially outward. However, the interval between the tip of the third tooth and the tip of the fourth tooth 636 is narrower than the interval between the first tooth 636 and the second tooth 636. Also, the long side portion of the tip of the fourth tooth 636 is disposed toward the fifth tooth 636 which is a winding direction of the winding 38.

In this way, a forward intermediate width slot 637CN is formed between the third tooth 636 and the fourth tooth 636.

A tip wide slot 637A is formed between the fourth tooth 636 and the fifth tooth 636. The tip of the fifth tooth 636 is reversed at a position at which a virtual circle illustrated by a dashed line intersects a virtual center line of the fifth tooth 636, and the long side portion is disposed toward the fourth tooth 636.

A bottom portion of the sixth tooth 636 which is in contact with the rotary shaft fixing section 661 is provided at a circumferential interval from the fifth tooth 636. However, the interval between the bottom portion of the sixth tooth 636 and the bottom portion of the fifth tooth 636 is narrower than the interval between the bottom portion of the second tooth 636 and the bottom portion of the third tooth 636. The tip of the sixth tooth 636 extends in a direction away from the fifth tooth 636 as it goes radially outward. However, the interval between the tip of the sixth tooth 636 and the tip of the fifth tooth 636 is narrower than the interval between the fourth tooth 636 and the fifth tooth 636. Also, the long side portion of the tip of the sixth tooth 636 is reversed at a position at which a virtual circle illustrated by a dashed line intersects a virtual center line of the sixth tooth 636, and the long side portion is disposed toward the fifth tooth 636.

In this way, a reverse intermediate width slot 637CR is formed between the fifth tooth 636 and the sixth tooth 636. Both the tip of the fifth tooth 636 and the tip of the sixth tooth 636 constituting the reverse intermediate width slot 637CR are reversed, and the long side portion is disposed in a direction opposite to the winding direction of the winding 38.

Likewise, a bottom wide slot 637B is formed between the sixth tooth 636 and the seventh tooth 636. The long side portion of the tip of the seventh tooth 636 is disposed toward the eighth tooth 636 which is a winding direction of the winding 38.

A forward intermediate width slot 637CN is formed between the seventh tooth 636 and the eighth tooth 636. The long side portion of the tip of the eighth tooth 636 is disposed toward the ninth tooth 636 which is a winding direction of the winding 38.

A tip wide slot 637A is formed between the eighth tooth 636 and the ninth slot 636. The long side portion of the tip of the ninth tooth 636 is reversed at a position at which a virtual circle illustrated by a dashed line intersects a virtual center line of the ninth tooth 636, and the long side portion is disposed toward the eighth tooth 636.

A bottom wide slot 637B is formed between the ninth tooth 636 and the tenth tooth 636. The long side portion of the tip of the tenth tooth 636 is disposed toward the eleventh tooth 636 which is a winding direction of the winding 38.

A forward intermediate width slot 637CN is formed between the tenth tooth 636 and the eleventh tooth 636. The long side portion of the tip of the eleventh tooth 636 is disposed toward the twelfth tooth 636 which is a winding direction of the winding 38.

A tip wide slot 637A is formed between the eleventh tooth 636 and the twelfth slot 636. The tip of the twelfth tooth 636 is reversed at a position at which a virtual circle illustrated by a dashed line intersects a virtual center line of the twelfth tooth 636, and the long side portion is disposed toward the eleventh tooth 636.

A bottom wide slot 637B is formed between the twelfth tooth 636 and the thirteenth tooth 636. The long side portion of the tip of the thirteenth tooth 636 is disposed toward the fourteenth tooth 636 which is a winding direction of the winding 38.

A forward intermediate width slot 637CN is formed between the thirteenth tooth 636 and the fourteenth tooth 636. The long side portion of the tip of the fourteenth tooth 636 is disposed toward the fifteenth tooth 636 which is a winding direction of the winding 38.

A tip wide slot 637A is formed between the fourteenth tooth 636 and the fifteenth tooth 636. The tip of the fifteenth tooth 636 is reversed at a position at which a virtual circle illustrated by a dashed line intersects a virtual center line of the fifteenth tooth 636, and the long side portion is disposed toward the fourteenth tooth 636.

A reverse intermediate width slot 637CR is formed between the fifteenth tooth 636 and the sixteenth tooth 636. The tip of the sixteenth tooth 636 is reversed at a position at which a virtual circle illustrated by a dashed line intersects a virtual center line of the sixteenth tooth 636, and the long side portion is disposed toward the fifteenth tooth 636.

A bottom wide slot 637B is formed between the sixteenth tooth 636 and the seventeenth tooth 636. The long side portion of the tip of the seventeenth tooth 636 is disposed toward the eighteenth tooth 636 which is a winding direction of the winding 38.

A forward intermediate width slot 637CN is formed between the seventeenth tooth 636 and the eighteenth tooth 636. The long side portion of the tip of the eighteenth tooth 636 is disposed toward the nineteenth tooth 636 which is a winding direction of the winding 38.

A tip wide slot 637A is formed between the eighteenth tooth 636 and the nineteenth slot 636. The tip of the nineteenth tooth 636 is reversed at a position at which a virtual circle illustrated by a dashed line intersects a virtual center line of the nineteenth tooth 636, and the long side portion is disposed toward the eighteenth tooth 636.

A bottom wide slot 637B is formed between the nineteenth tooth 636 and the twentieth tooth 636. The long side portion of the tip of the twentieth tooth 636 is disposed toward the first tooth 636 which is a winding direction of the winding 38.

A forward intermediate width slot 637CN is formed between the twentieth tooth 636 and the first tooth 636.

Figure 29:
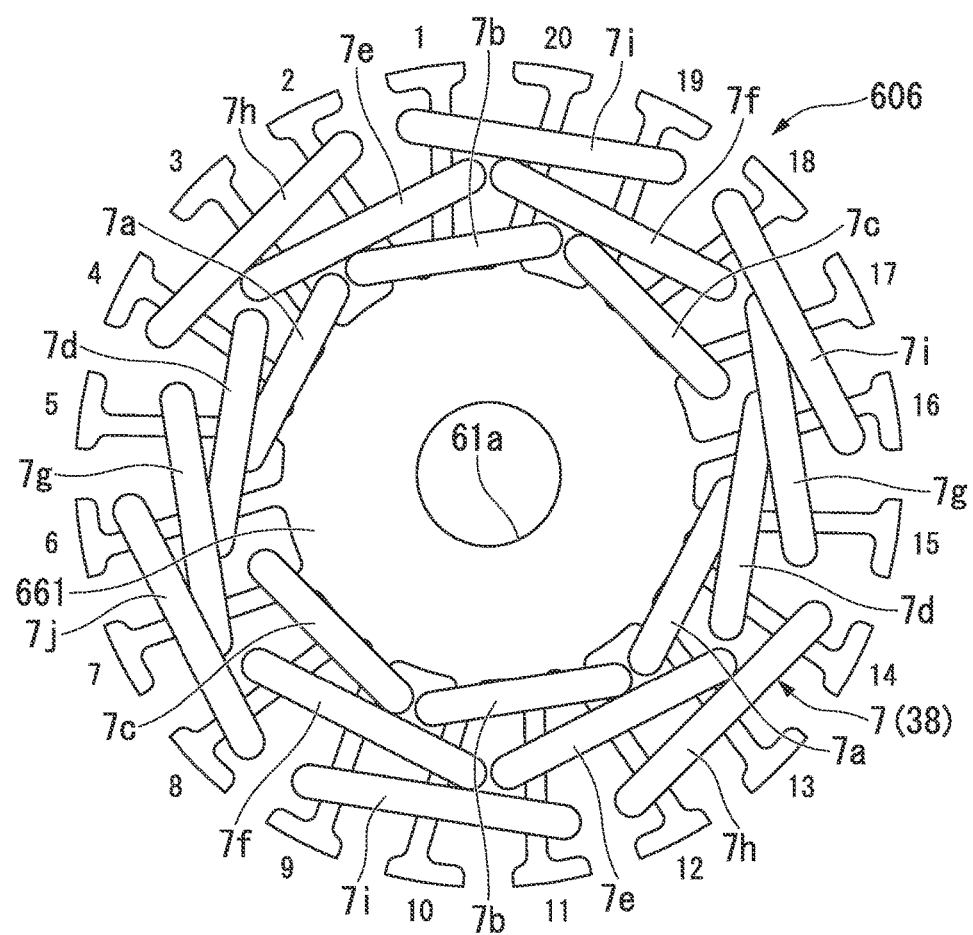
FIG. 29 is an explanatory view in which a winding state of the armature coil on the armature core according to the sixth embodiment of the present invention is viewed in the axial direction.

FIG. 29 illustrates a state in which the armature coil 7 is wound around the armature core 606 configured in this way.

Figure 4:
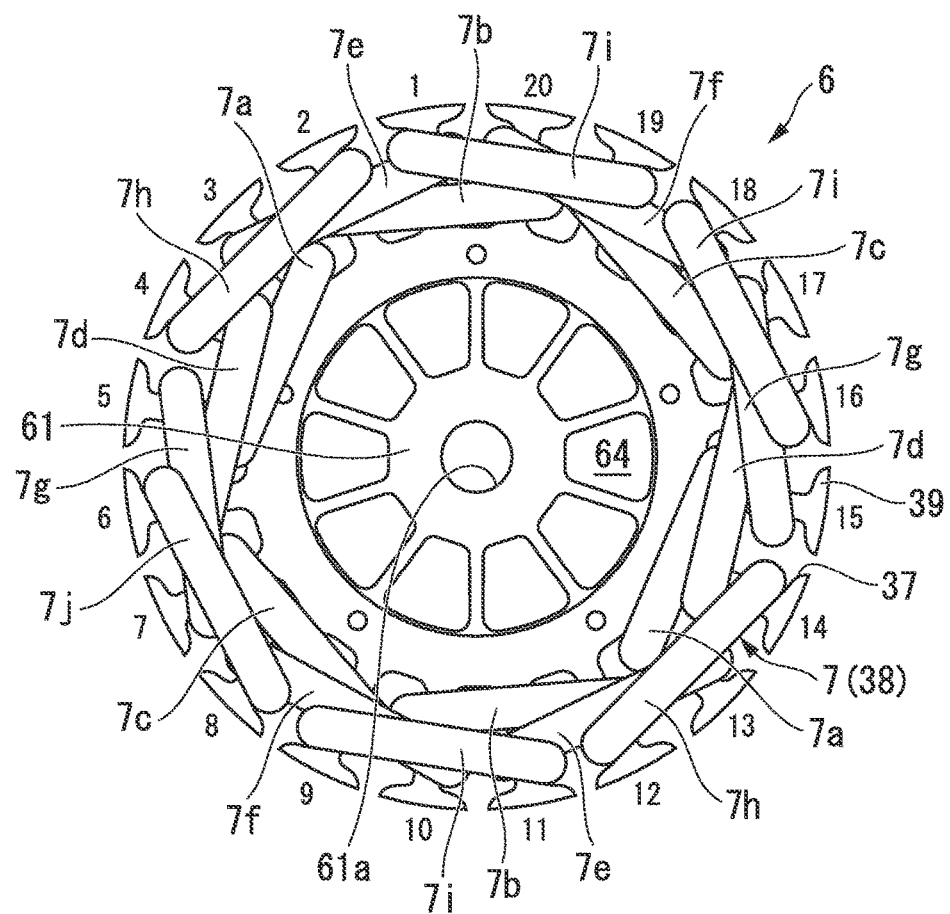
FIG. 4 is an explanatory view in which a winding state of the armature coil on an armature core according to the first embodiment of the present invention is viewed from an axial direction.

As illustrated in FIG. 29, the armature coil 7 wound around the armature core 606 is wound in the same order as in the first embodiment illustrated in FIG. 4. However, in this embodiment, the arrangement structure on the armature core 606 of the wound armature coil 7 differs.

That is, in this embodiment, the slot 637 formed adjacent to the teeth 636 of the coil in the second half (such as a coil that is wound around the teeth 2 to 4) is formed in the tip wide slot 637A, thereby sufficiently securing a winding space of the coil 7 at the tip of the teeth 636. Moreover, the slot 637 formed adjacent to the teeth 636 of the coil (such as a coil that is wound around the teeth 7 to 9) near the center to be wound on the first half is formed at the bottom wide slot 637B, thereby sufficiently securing a winding space of the coil 7 at the bottom portion of the teeth 636. Moreover, the slot 637 formed adjacent to the teeth 636 of the coil (such as a coil that is wound around the teeth 8 to 10) near the radial center of the teeth 636 wound halfway is constituted in the intermediate width slot 637C, thereby sufficiently securing the winding space of the coil 7 near the radial center of the teeth 636.

In this embodiment, by changing the shape of the slot 637 depending on the position at which the coil 7 is wound around the teeth 636 by the configuration illustrated in FIGS. 28 and. 29, a sufficient winding space of the coil 7 is secured. As a result, it is possible to improve the space factor and the windability of the armature coil 7 in the armature core 606.

Thus, in this embodiment, it is possible to reduce the radial height of the armature coil 7 in the armature core 606. This makes it possible to reduce copper loss by reducing the copper amount. Also, it is possible to shorten the motor shaft length. Thus, in this embodiment, it is possible to reduce the size and weight of the electric motor.

In this embodiment, like the concentrated winding, since the core and the coil come into direct contact with each other without an overlap between the coils while the distributed winding is performed, an effect in which the heat dissipation of the coil can be improved is obtained.

(Modified Example of Sixth Embodiment)

In FIGS. 28 and 29, the sixth embodiment of the present invention has been described on the basis of the 20-slot 20-segment armature core 606. However, the sixth embodiment of the present invention, for example, can also be applied to the 14-slot 14-segment armature core described in the second embodiment or the 16-slot 16-segment armature core described in the third embodiment.

Figure 30:
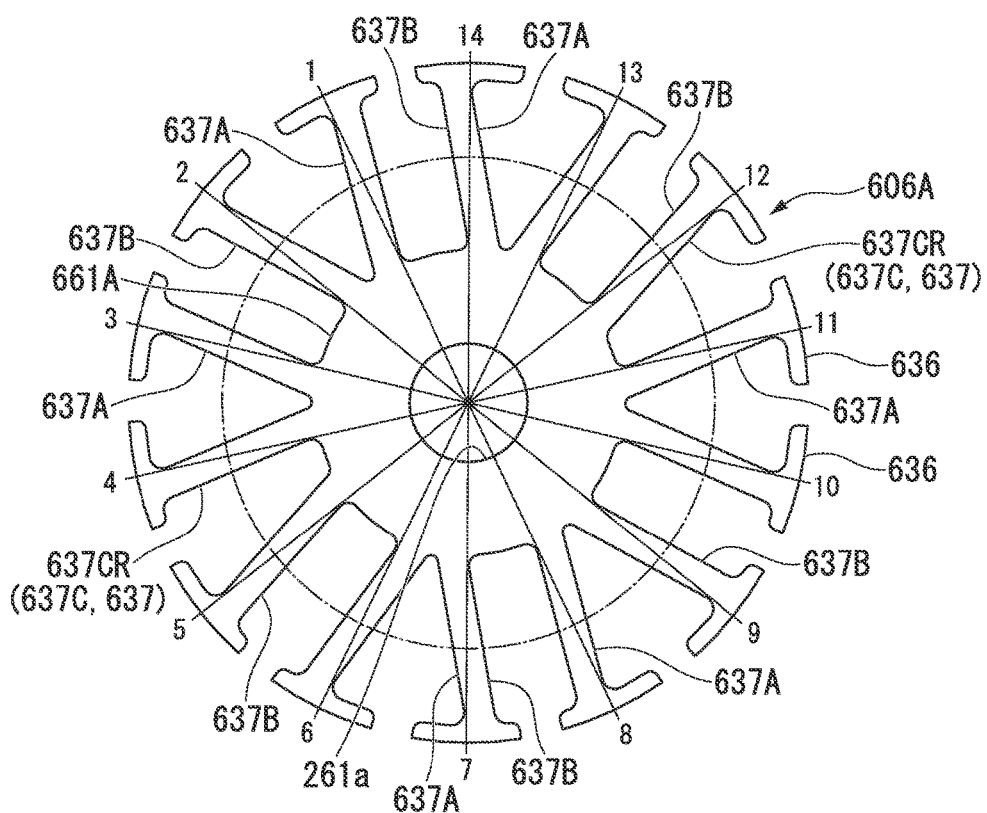
FIG. 30 is a diagram illustrating an armature core according to a first modified example of the sixth embodiment of the present invention.
Figure 31:
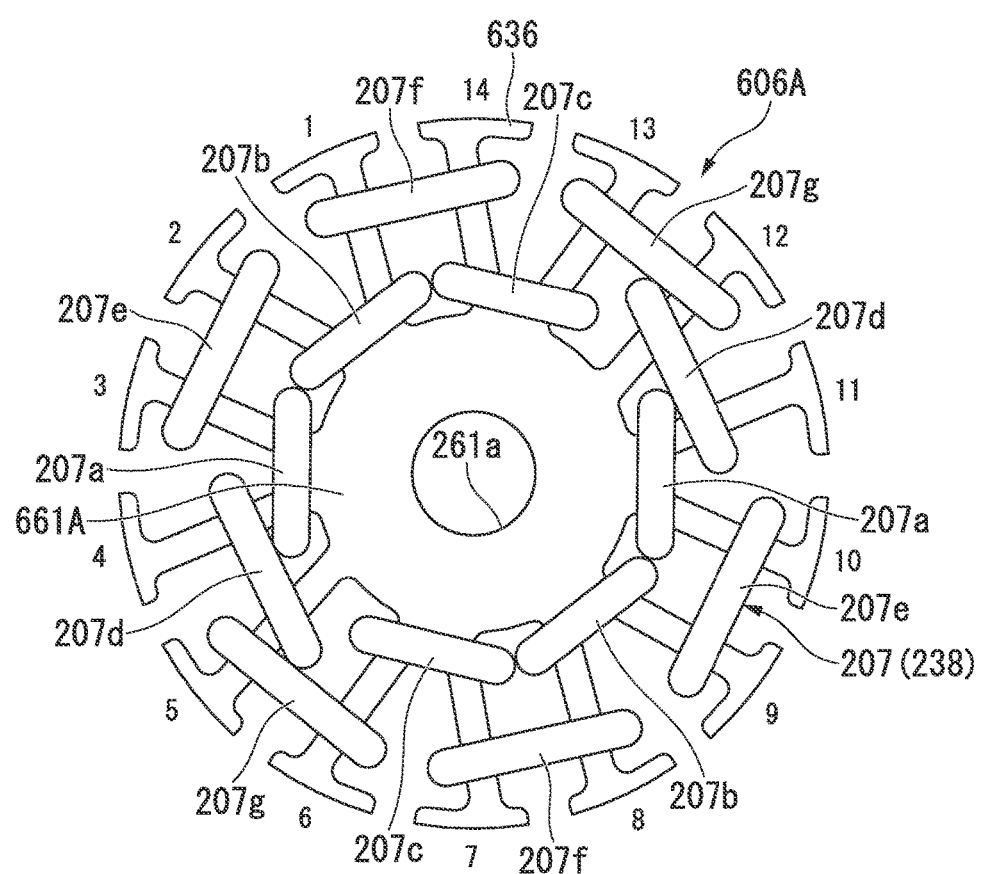
FIG. 31 is an explanatory view in which the winding state of the armature coil on the armature core according to the first modified example of the sixth embodiment of the present invention is viewed in the axial direction.

FIGS. 30 and 31 illustrate a first modified example in which the sixth embodiment of the present invention is applied to the 14-slot 14-segment armature core. Further, FIGS. 32 and 33 illustrate a third modified example in which the sixth embodiment of the present invention is applied to the 16-slot 16-segment armature core.

FIG. 30 is a diagram illustrating an armature core according to a first modified example of the sixth embodiment of the present invention. FIG. 31 is an explanatory view in which the winding state of the armature coil on the armature core according to a first modified example of the sixth embodiment of the present invention is viewed in the axial direction.

Figure 32:
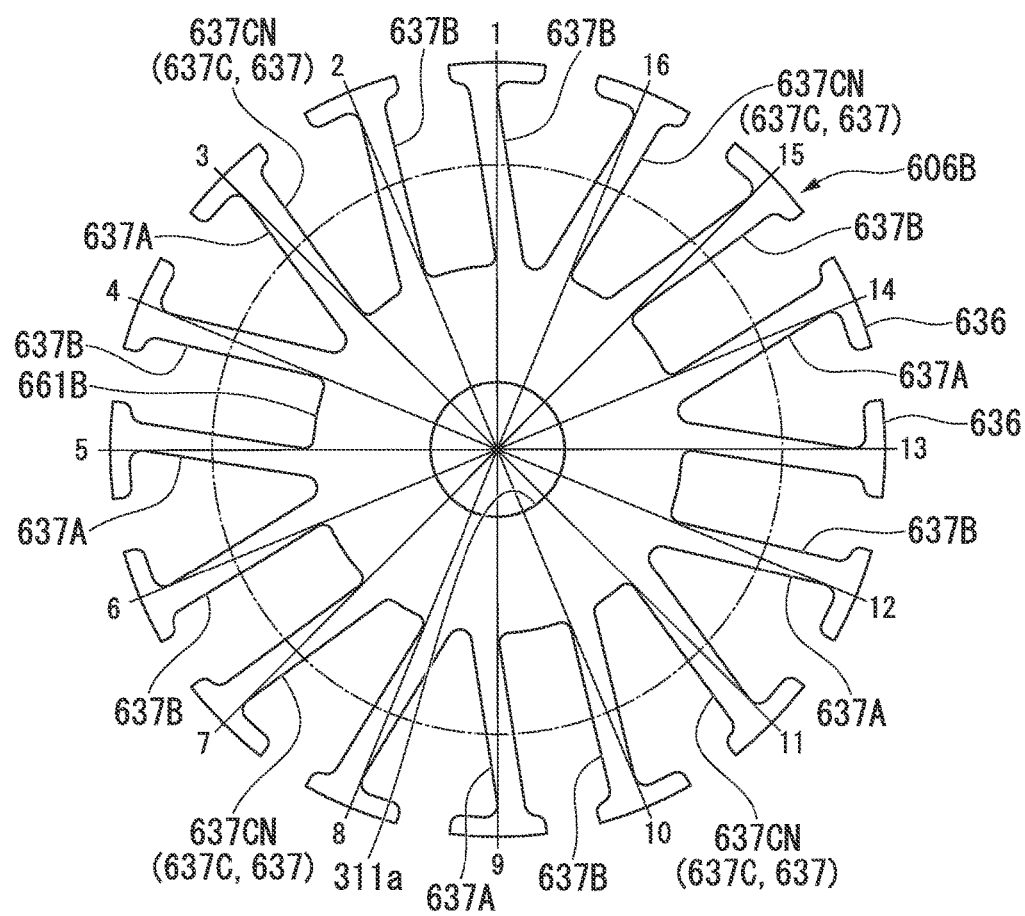
FIG. 32 is a diagram illustrating an armature core according to a second modified example of the sixth embodiment of the present invention.
Figure 33:
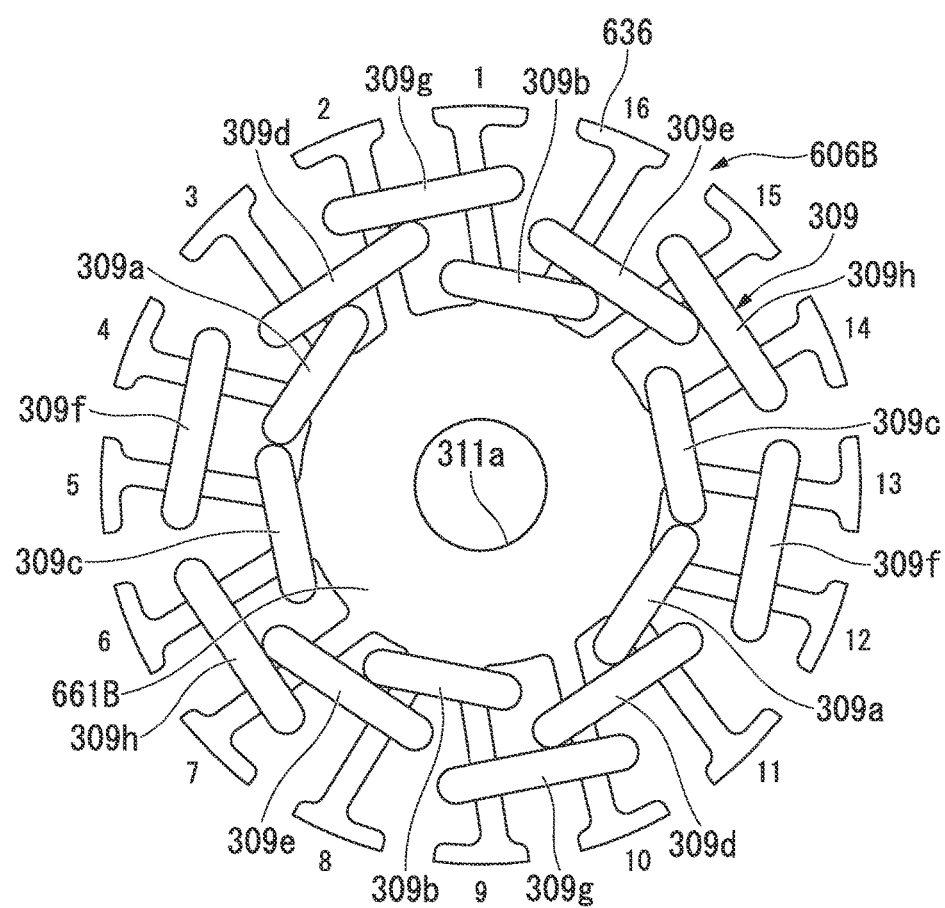
FIG. 33 is an explanatory view in which a winding state of the armature coil on the armature core according to the second modified example of the sixth embodiment of the present invention is viewed in the axial direction.

FIG. 32 is a diagram illustrating an armature core according to a second modified example of the sixth embodiment of the present invention. FIG. 33 is an explanatory view in which a winding state of the armature coil on the armature core according to a second modified example of the sixth embodiment of the present invention is viewed in the axial direction.

In this way, the sixth embodiment of the present invention can be applied to the 14-slot 14-segment armature core or may be applied to the 16-slot 16-segment armature core.

In these modified examples, like the sixth embodiment, it is also possible to improve the space factor and the windability of the armature coil 7 in the armature core 606. Thus, in these modified examples, it is also possible to reduce the radial height of the armature coil in the armature core. This makes it possible to reduce the copper loss by reducing the copper content. Also, it is possible to shorten the motor shaft length. Thus, in the present embodiment, it is possible to reduce the size and weight of the electric motor.

Also, in these modified examples, like the concentrated winding, since the core and the coil come into direct contact with each other without an overlap between the coils while the distributed winding is performed, an effect in which the heat dissipation of the coil can be improved is obtained.

Further, the present invention is not limited to the above-described embodiments, and includes various modified examples made to the above-described embodiments without departing from the scope of the present invention.

For example, in the above-described third embodiment, the case of using the three brushes 321a to 321c has been described. However, the brush is not limited thereto but may be made up of only the low-speed brush 321a and the common brush 321c.

Further, in the above-described embodiments, the case in which the armature coils 7, 207 and 309 are formed in the double flyer method has been described. However, not being limited thereto, it is also possible to form the armature coils 7, 207 and 309 in a so-called single flyer method which is performed only by one flyer.

Furthermore, in the above-described first embodiment, the description has been given of a case where the single wave winding is applied to the winding structure of the armature coil 7 in the 6-pole 20-slot 20-segment electric motor 1.

Further, in the above-described second embodiment, the case in which the single wave winding is applied to the winding structure of the armature coil 207 in the 6-pole 14-slot 14-segment electric motor 201 has been described. Further, in the above-described third embodiment, the case in which the single wave winding is applied to the winding structure of the armature coil 309 in the 6-pole 16-slot 16-segment electric motor 302 has been described. However, the present invention is not limited thereto, and the number of slots may be an even number and the single wave winding may be performed. That is, the number of slots may be set to an even number which is not divisible by the number of pole pairs ("3" in this embodiment). However, as in the above-described embodiments, by setting the number of slots to 20, 14 and 16, it can be suitably used for a relatively compact electric motor, for example, an electric motor with an output of approximately 250 W.

Further, in the above-described first embodiment, for example, the case in which the electric motor 1 is used as a fan motor for cooling a radiator of a motor vehicle has been described. Furthermore, in the above-described second embodiment, for example, the case in which the electric motor unit 201 of the electric motor device 200 is used as a motor for driving a rear wiper has been described. Also, in the above-described third embodiment, for example, the case in which the electric motor 302 of the motor 301 with speed reduction gear is used to drive a wiper of a motor vehicle has been described. However, the electric motor 1, the electric motor unit 201 and the electric motor 302 of the above-described embodiments are not limited thereto but may be used to drive various devices, such as a device for driving a seat of a motor vehicle and a device for driving a sunroof.

INDUSTRIAL APPLICABILITY

According to the above-described electric motor, by adopting the single wave winding, it is possible to reduce the voltage between the segments as compared to the multiple winding method. Also, it is possible to adopt a brush arrangement structure of a typical 2-pole motor in which the brushes are disposed opposite around the rotary shaft. Furthermore, it is possible to shorten the winding time of the coil without requiring an equalizer. Further, it is possible to adopt a so-called double flyer method in which the winding is wound around the armature core, or the windings are simultaneously wound at two positions around the rotary shaft in a point-symmetric relationship. Also, by adopting the single wave winding while setting the number of slots to an even number, it is possible to obtain the same effect as the case in which the number of slots is set to an odd number. That is, it is possible to reduce the cogging torque and the torque ripple as in the case in which the number of slots is set to an even number, and the number of slots is set to an odd number. Furthermore, since the coil wired between the armature core and the commutator is wound around the rotary shaft, it is possible to suppress the spreading of the coil between the armature core and the commutator, as compared to the case of directly wiring the armature core and the commutator by the coil.

Thus, according to the above-described electric motor, it is possible to reduce the size and the cost while effectively achieving high performance.

REFERENCE SIGNS LIST 1, 302, 502 Electric motor
2, 202, 305 Yoke
4, 204, 307 Permanent magnet (magnetic pole)
5, 205, 303 Rotary shaft
6, 206, 308, 406, 606, 606A, 606B Armature core
7, 207, 309 Armature coil (coil)
7a to 7j, 207a to 207g, 309a to 309h Coil
13, 213, 310, 413, 510 Commutator
22, 222, 321, 521 Brush
36, 236, 312, 436, 636 Tooth
37, 237, 313, 637 Slot
637A Tip wide slot
637B Bottom wide slot
637C Intermediate width slot
637CN Forward intermediate width slot
637CR Reverse intermediate width slot
38, 238, 314 Winding
40a, 240a, 310a Outer circumferential surface
41, 241, 315, 441, 515 Segment
200, 400 Electric motor device
201, 401 Electric motor unit (electric motor)
301, 501 Speed reduction gear with motor
321a, 521a Low-speed brush
321b, 521b High-speed brush
321c, 521c Common brush
440a, 511a One surface

The invention claimed is:

1. An electric motor comprising:
a yoke having six magnetic poles;
a rotary shaft which is provided inside the yoke in a freely rotatable manner;
an armature core which has teeth attached to the rotary shaft, radially extending in a radial direction and set in an arrangement of an even number, and an even number of slots formed between the teeth;
a coil which is wound around the teeth in a single wave winding;
a commutator which is provided in the rotary shaft to be adjacent to the armature core and has a plurality of circumferentially disposed segments to which the coil is connected; and
three brushes including a low-speed brush, a high-speed brush and a common brush, the low-speed brush and the high-speed brush coming into slide contact with the segments to supply the electric power to the coil, and the common brush being commonly used with the low-speed brush and the high-speed brush.

2. The electric motor according to claim 1, wherein the coil wired between the armature core and the commutator is wound around the rotary shaft.

3. The electric motor according to claim 1, wherein the commutator has a cylindrical commutator main body, and a plurality of segments is disposed on an outer circumferential surface of the commutator main body.

4. The electric motor according to claim 1, wherein the commutator has a disc-shaped commutator main body, and a plurality of segments is disposed on one surface of the commutator main body on a side opposite to the armature core.

5. The electric motor according to claim 1, wherein the even number of slots comprise a tip wide slot having a shape in which a radial outer side is wide, and a bottom wide slot having a shape in which a bottom portion is wide.

6. The electric motor according to claim 5, wherein the even number of slots further comprise an intermediate width slot having a shape in which the radial outer side is narrower than the tip wide slot and the bottom portion is narrower than the bottom wide slot.

7. The electric motor according to claim 5, wherein the plurality of teeth have an asymmetrical shape in which the tip has a long side portion and a short side portion, and among the plurality of teeth, in the teeth constituting the tip wide slot, the tip rotates and the arrangement of the long side portion and the short side portion is reversed.

8. The electric motor according to claim 6 or 7, wherein the tip wide slot, the bottom wide slot and the intermediate width slot are disposed to correspond to a radial position in which the coil is wound around the teeth.

9. The electric motor according to claim 1, wherein the number of the teeth and the slots are set to one of 14, 16 and 20.

* * * * *